(12) United States Patent
Futae et al.

(10) Patent No.: US 10,690,141 B2
(45) Date of Patent: Jun. 23, 2020

(54) SEAL STRUCTURE AND SUPERCHARGER PROVIDED WITH THE SEAL STRUCTURE

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Hiroshi Suzuki, Tokyo (JP); Noriyuki Hayashi, Tokyo (JP); Takuya Miyazawa, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 963 days.

(21) Appl. No.: 15/110,144

(22) PCT Filed: Feb. 25, 2014

(86) PCT No.: PCT/JP2014/054502
§ 371 (c)(1),
(2) Date: Jul. 7, 2016

(87) PCT Pub. No.: WO2015/128935
PCT Pub. Date: Sep. 3, 2015

(65) Prior Publication Data
US 2016/0356283 A1 Dec. 8, 2016

(51) Int. Cl.
*F04D 29/12* (2006.01)
*F02B 39/14* (2006.01)
(Continued)

(52) U.S. Cl.
CPC .......... *F04D 29/122* (2013.01); *F01D 11/003* (2013.01); *F02B 39/14* (2013.01);
(Continued)

(58) Field of Classification Search
CPC .... F04D 29/053; F04D 29/056; F04D 29/284; F04D 29/122; F16J 15/164; F16J 15/24;
(Continued)

(56) References Cited

U.S. PATENT DOCUMENTS

2001/0036403 A1  11/2001  Heyes
2005/0189725 A1*  9/2005  Edwards .................. B32B 1/04
                                                       277/615
2010/0202875 A1  8/2010  Schlienger et al.

FOREIGN PATENT DOCUMENTS

CN    1928335 A    3/2007
CN    201560838 U  8/2010
(Continued)

OTHER PUBLICATIONS

International Preliminary Report on Patentability and Written Opinion of the International Searching Authority (forms PCT/IB/373, PCT/ISA/237, PCT/IB/338 and PCT/IB/326), dated Sep. 9, 2016, for International Application No. PCT/JP2014/054502, with an English translation of the Written Opinion.
(Continued)

*Primary Examiner* — Igor Kershteyn
*Assistant Examiner* — Danielle M Christensen
(74) *Attorney, Agent, or Firm* — Birch, Stewart, Kolasch & Birch, LLP

(57) ABSTRACT

An object is to provide a seal structure capable of reducing abrasion of a seal ring without increasing the number of components and of minimizing generation of abrasion powder. A seal structure to seal clearance between an outer peripheral surface 8*a* of a rotary shaft 8 and an inner peripheral surface 6*a* of a bearing housing 6 includes: a first seal groove 22A formed on the outer peripheral surface 8*a* of the rotary shaft 8; a second seal groove 22B disposed between the first seal groove and the impeller; a first seal ring 26 to be mounted to the first seal groove; and a second
(Continued)

seal ring 28 to be mounted to the second seal groove. The first seal ring 26 includes a first-seal body portion 26A mounted to the first seal groove, and a first-seal protruding portion 26B protruding from the first-seal body portion toward the second seal ring 28, and being configured to be in contact with the second seal ring contacting a bearing-side wall surface 22Ba of the second seal groove, in a state in which the first-seal body portion is in contact with a bearing-side wall surface 22Aa of the first seal groove.

17 Claims, 11 Drawing Sheets

(51) Int. Cl.
| | | |
|---|---|---|
| *F01D 11/00* | (2006.01) | |
| *F16J 15/16* | (2006.01) | |
| *F16J 15/44* | (2006.01) | |
| *F16J 15/3272* | (2016.01) | |
| *F16J 15/24* | (2006.01) | |
| *F04D 29/053* | (2006.01) | |
| *F04D 29/056* | (2006.01) | |
| *F04D 29/28* | (2006.01) | |
| *F01D 25/18* | (2006.01) | |
| *F02B 33/40* | (2006.01) | |

(52) U.S. Cl.
CPC ......... *F04D 29/053* (2013.01); *F04D 29/056* (2013.01); *F04D 29/284* (2013.01); *F16J 15/164* (2013.01); *F16J 15/24* (2013.01); *F16J 15/3272* (2013.01); *F16J 15/441* (2013.01); *F01D 25/186* (2013.01); *F02B 33/40* (2013.01); *F05D 2220/40* (2013.01); *F05D 2240/60* (2013.01)

(58) Field of Classification Search
CPC .... F16J 15/3272; F16J 15/441; F01D 11/003; F01D 25/186; F02B 39/14; F05D 2240/60; F05D 2220/40

See application file for complete search history.

(56) References Cited

FOREIGN PATENT DOCUMENTS

| | | | | |
|---|---|---|---|---|
| CN | 103452650 A | 12/2013 | | |
| DE | 102012019166 A1 * | 4/2014 | ............... | F16J 15/24 |
| EP | 1 762 713 A2 | 3/2007 | | |
| EP | 2 037 100 A1 | 3/2009 | | |
| JP | 2001-271651 A | 10/2001 | | |
| JP | 2004-116514 A | 4/2004 | | |
| JP | 2008-106638 A | 5/2008 | | |
| JP | 2008-286079 A | 11/2008 | | |
| JP | 2009-121274 A | 6/2009 | | |
| JP | 2010-185455 A | 8/2010 | | |
| JP | 4816562 B2 | 11/2011 | | |
| JP | 2012-57507 A | 3/2012 | | |
| JP | 5071886 B2 | 11/2012 | | |
| JP | 5071887 B2 | 11/2012 | | |
| JP | 2013-50090 A | 3/2013 | | |
| KR | 2007-0029551 A | 3/2007 | | |
| WO | WO 2008/149075 A1 | 12/2008 | | |

OTHER PUBLICATIONS

International Search Report (forms PCT/ISA/220 and PCT/ISA/210), dated Apr. 28, 2014, for International Application No. PCT/JP2014/054502.

Office Action dated Jan. 19, 2018 issued to the corresponding Chinese Application No. 201480073650.7.

Extended European Search Report dated Mar. 10, 2017 issued to the corresponding EP Application No. 14884001.0.

* cited by examiner

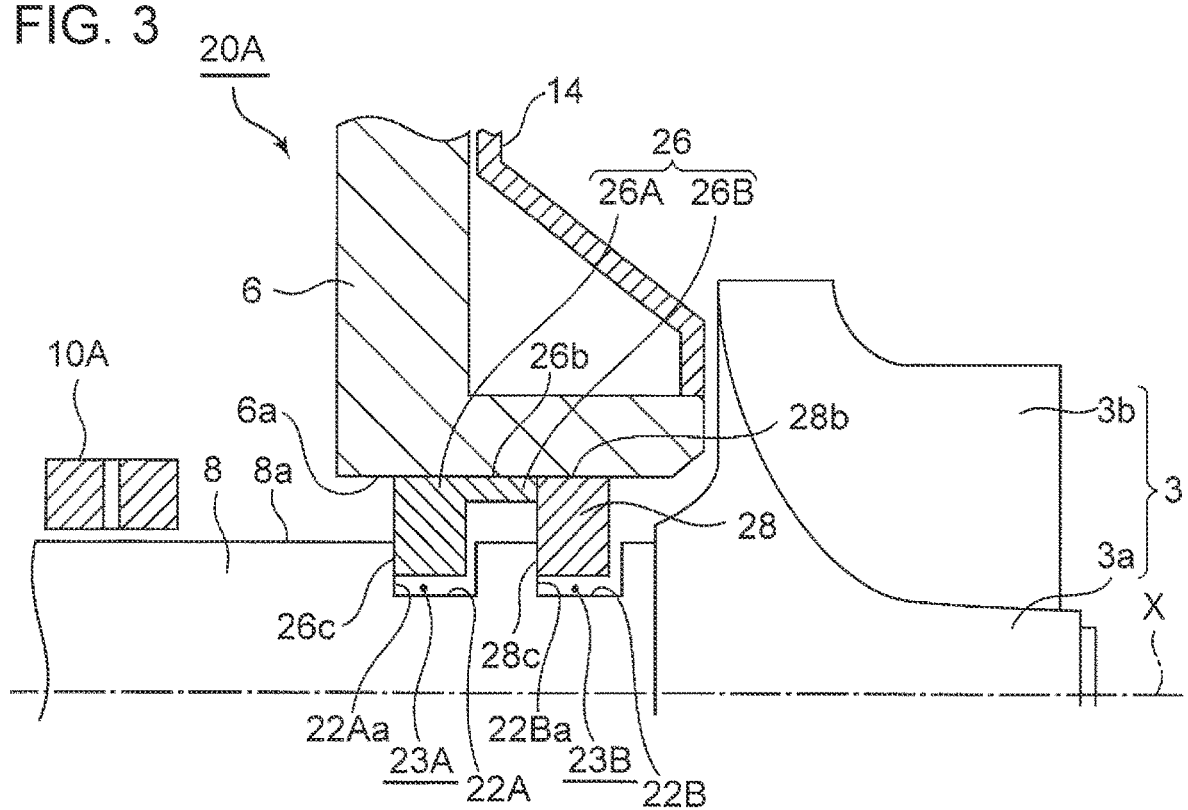

SEAL STRUCTURE AND SUPERCHARGER PROVIDED WITH THE SEAL STRUCTURE

TECHNICAL FIELD

The present disclosure relates to a seal structure and a supercharger provided with the seal structure, specifically to a seal structure used in a supercharger including a rotary shaft, an impeller disposed on an end portion of the rotary shaft, and a bearing housing which accommodates a bearing for rotatably supporting the rotary shaft, the seal structure being provided to seal a gap between an outer peripheral surface of the rotary shaft and an inner peripheral surface of the bearing housing, as well as to a supercharger provided with the seal structure.

BACKGROUND ART

Typically, as a technique to improve an output of an engine, a method (supercharging) of compressing intake air with a supercharger such as a turbocharger and supplying an engine with the compressed intake air is known, and widely used in an engine for an automobile and the like.

A turbocharger normally includes a rotary shaft, a turbine impeller disposed on an end side of the rotary shaft, a compressor impeller disposed on the opposite end side of the rotary shaft, and a bearing housing which accommodates a bearing for rotatably supporting the rotary shaft. The rotary shaft rotates at a high speed in response to exhaust energy of exhaust gas being applied to the turbine impeller, and thereby the compressor impeller disposed on the opposite end side of the rotary shaft compresses intake air.

For the bearing rotatably supporting the rotary shaft, lubricant oil is supplied to clearance between the rotary shaft and a bearing surface. A seal ring is disposed between the outer peripheral surface of the rotary shaft and the inner peripheral surface of the bearing housing to prevent leakage of the lubricant oil along the rotary shaft. The seal ring has an outer peripheral surface contacting the inner peripheral surface of the bearing housing due to elasticity, and has an edge surface contacting a bearing-side wall surface of a seal groove formed on the outer peripheral surface of the rotary shaft due to a pressure of high-pressure gas, thereby sealing the clearance between the outer peripheral surface of the rotary shaft and the inner peripheral surface of the bearing housing.

Further, the seal ring also has a function to prevent leakage, along the rotary shaft, of high-pressure exhaust gas to be supplied to the turbine impeller, and high-pressure intake gas compressed by the compressor impeller.

The seal ring is formed from an elongated seal member processed into a ring shape, and has a butting section where opposite end surfaces of the seal ring are adjacent but have a gap between each other. Thus, with only one seal ring provided, it would be difficult to completely eliminate leakage of a fluid through the butting section. Accordingly, there is a technique that provides two seal rings.

In a seal structure provided with two seal rings, one of the seal rings is disposed by the side of an impeller which is subject to action of high-pressure gas, and is pressed against a bearing-side wall surface of a seal groove formed on an outer peripheral surface of a rotary shaft. In such a structure, however, a seal ring may become worn, which may deteriorate durability of the seal ring. Patent Documents 1 and 2 disclose a seal structure as a typical technique to solve the above problem.

Patent Document 1 discloses a seal structure with two seal rings, the first seal ring and the second seal ring, disposed between an outer peripheral surface of a rotary shaft and an inner peripheral surface of a bearing housing. The seal structure of patent Document 1 further includes a stopper disposed between the first seal ring and the second seal ring. The stopper is to restrict movement of the second seal ring disposed by the side of an impeller toward the first seal ring. The stopper reduces a pressing force applied by high-pressure gas from the impeller to press the second seal ring against a bearing-side wall surface (the second cylindrical portion) of a seal groove formed on the outer peripheral surface of the rotary shaft, thereby suppressing wear of the second seal ring.

Patent Document 2 discloses a seal structure with two seal rings, the first seal ring and the second seal ring, disposed between an outer peripheral surface of a rotary shaft and an inner peripheral surface of a bearing housing. In the seal structure of Patent Document 2, the second seal ring by the side of an impeller has a seal width broader than the width of a partition wall formed between the first seal ring and the second seal ring. If wear of the second seal ring develops as the second seal ring is pressed against the partition wall by high-pressure gas from the impeller, the second seal ring partially extends beyond the partition wall to contact the first seal ring. Accordingly, a pressing force which presses the second seal ring against the partition wall is reduced, and further development of wear on the second seal ring is suppressed.

CITATION LIST

Patent Literature

Patent Document 1: JP4816562B
Patent Document 2: 2012-57507A

SUMMARY

Problems to be Solved

In the above described seal structure of Patent Document 1, the stopper disposed between the first seal ring and the second seal ring is a separate member from the first seal ring and the second seal ring. Thus, the number of parts is increased, which may bring about a cost increase. Besides, the stopper needs to be attached so that both end surfaces of the stopper contact the first seal ring and the second seal ring evenly and uniformly, which requires high attachment accuracy.

Moreover, in the above described seal structure of Patent Document 2, development of wear of the second seal ring is suppressed only after the second seal ring has become worn to some extent. In other words, the seal structure permits a certain level of wear of a seal ring positively. Abrasion powder is therefore produced inevitably, and may enter clearance between a rotary shaft and a bearing surface to increase friction on the bearing.

At least one embodiment of the present invention was made in view of the above typical problems, and an object of at least one embodiment is to provide a seal structure capable of reducing wear of a seal ring without increasing the number of components, and of minimizing generation of abrasion powder, as well as a supercharger provided with the seal structure.

Solution to the Problems (1) A seal structure according to at least one embodiment of the present invention is for a supercharger including a rotary shaft, an impeller disposed on an end portion of the rotary shaft, and a bearing housing which accommodates a bearing for rotatably supporting the rotary shaft, the seal structure being provided to seal clearance between an outer peripheral surface of the rotary shaft and an inner peripheral surface of the bearing housing, and comprises: a first seal groove of an annular shape, formed on the outer peripheral surface of the rotary shaft and between the impeller and the bearing with respect to an axial direction of the rotary shaft; a second seal groove of an annular shape, formed on the outer peripheral surface of the rotary shaft and between the impeller and the bearing with respect to the axial direction of the rotary shaft, and disposed between the first seal groove and the impeller; a first seal ring to be mounted to the first seal groove; and a second seal ring to be mounted to the second seal groove. The first seal ring includes, in a state in which the first seal ring is mounted to the first seal groove, a first-seal body portion mounted to the first seal groove, and a first-seal protruding portion protruding from the first-seal body portion toward the second seal ring mounted to the second seal groove, and being configured to be in contact with the second seal ring contacting a bearing-side wall surface of the second seal groove, in a state in which the first-seal body portion is in contact with a bearing-side wall surface of the first seal groove.

According to the seal structure described in the above (1), the seal structure includes two seal rings, the first seal ring mounted to the first seal groove and the second seal ring mounted to the second seal groove, and the first seal ring disposed on the side of the bearing includes the first-seal body portion and the first-seal protruding portion protruding from the first-seal body portion toward the second seal ring. The first-seal protruding portion is configured to contact the second seal ring in a state of contacting the bearing-side wall surface of the second seal groove, in a state where the first-seal body portion is in contact with the bearing-side wall surface of the first seal groove.

Thus, the first-seal protruding portion of the first seal ring contacts the second seal ring when the second seal ring is pressed against the bearing-side wall surface of the second seal groove by high-pressure gas from the impeller, and thereby a pressing force that presses the second seal ring against the bearing-side wall surface of the second seal groove is reduced. Accordingly, it is possible to reduce wear of the second seal ring.

Furthermore, the first-seal protruding portion is configured to contact the second seal ring even before the second seal ring gets worn. Thus, an effect to reduce wear of the second seal ring can be exerted even before the second seal ring gets worn, and thereby it is possible to minimize generation of abrasion powder, as compared to the typical technique disclosed in Patent Document 2 described above.

(2) In some embodiments, in the above seal structure (1), the second seal ring includes, in a state in which the second seal ring is mounted to the second seal groove, a second-seal body portion mounted to the second seal groove, and a second-seal protruding portion protruding from the second-seal body portion toward the first seal ring mounted to the first seal groove, and being configured to be in contact with the first seal ring contacting the bearing-side wall surface of the first seal groove, in a state in which the second-seal body portion is in contact with the bearing-side wall surface of the second seal groove. The first-seal protruding portion of the first seal ring is formed continuously over half a circumference of the first seal ring in a circumferential direction. The second-seal protruding portion of the second seal ring is formed continuously over half a circumference of the second seal ring in the circumferential direction. The first-seal protruding portion of the first seal ring is configured to be in contact with the second-seal body portion of the second seal ring, and the second-seal protruding portion of the second seal ring is configured to be in contact with the first-seal body portion of the first seal ring, in a state in which the first seal ring and the second seal ring are respectively mounted to the first seal groove and the second seal groove.

With the seal structure described in the above (2), in a state where the first seal ring and the second seal ring are respectively mounted to the first seal groove and the second seal groove, the first-seal protruding portion of the first seal ring contacts the second-seal body portion of the second seal ring, and the second-seal protruding portion of the second seal ring contacts the first-seal body portion of the first seal ring. Accordingly, it is possible to reduce wear of the second seal ring.

Further, the first-seal protruding portion of the first seal ring and the second-seal protruding portion of the second seal ring are each formed continuously over half a circumference in the circumferential direction. Thus, even if the first seal ring and the second seal ring revolve following the rotary shaft, the relative phase in the circumferential direction of the two seal rings does not change. Accordingly, it is possible to prevent respective butting sections of the first seal ring and the second seal ring from being positioned at the same phase in the circumferential direction.

(3) In some embodiments, in the above seal structure (2), the first seal ring and the second seal ring are formed to have the same shape.

With the seal structure described in the above (3), the two seal rings have the same shape and thus it is sufficient if only one kind of seal rings is produced, which makes it possible to reduce production cost as compared to a case in which two kinds of seal rings varied in shape are produced. Further, during arrangement of seal rings, one should take care of only the direction in which seal rings are to be set, and thereby it is possible to prevent wrong combination of seal rings.

(4) In some embodiments, in the above seal structure (2), each of the first seal ring and the second seal ring comprises a seal-ring strip processed into a ring shape, and a butting section at which opposite end surfaces of the seal-ring strip face each other via a gap. Further, when the first seal ring and the second seal ring are respectively mounted to the first seal groove and the second seal groove, the butting section of the first seal ring and the butting section of the second seal ring are disposed at an interval of half a circumference in the circumferential direction from each other.

With the above seal structure (4), the butting section of the first seal ring and the butting section of the second seal ring are disposed at an interval of half a circumference in the circumferential direction from each other, and even if the first seal ring and the second seal ring rotate following the rotary shaft, the relative phase difference between the rings is maintained. In other words, the butting section of the first seal ring and the butting section of the second seal ring are always disposed at an interval of half a circumference in the circumferential direction from each other. Accordingly, it is possible to reduce leakage of a fluid through the butting section of one of the seal rings after the fluid leaks out thorough the butting section of the other one of the seal rings.

(5) In some embodiments, in the above seal structure (4), the gap of the butting section of the first seal ring in a state where the first seal ring is mounted to the first seal groove is greater than the gap of the butting section of the second seal ring in a state where the second seal ring is mounted to the second seal groove.

The first seal ring disposed on the side of the bearing has a sealing function mainly to prevent leakage of lubricant oil of the bearing toward the impeller. On the other hand, the second seal ring disposed on the side of the impeller has a sealing function mainly to prevent leakage of high-pressure gas toward the bearing.

With the seal structure described in the above (5), with the opening of the butting section of the first seal ring disposed on the side of the bearing being larger than the opening of the butting section of the second seal ring, it is possible to promote leakage of lubricant oil on the side of the bearing through the butting section of the first seal ring. Lubricant oil having leaked through the butting section of the first seal ring enters the clearance between the bearing-side wall surface of the second seal groove and the second seal ring, and reduces friction between the bearing-side wall surface and the second seal ring. Accordingly, it is possible to reduce wear of the second seal ring.

(6) In some embodiments, in the above seal structure (5), the first seal ring further includes a butting closing portion which is protruding toward the second seal ring mounted to the second seal groove and which is configured to fit into the butting section of the second seal ring, in a state where the first seal ring is mounted to the first seal groove.

With the seal structure described in the above (6), the first seal ring has the butting-closing portion configured to fit into the butting section of the second seal ring. With the butting-closing portion fitted into the butting section of the second seal ring, it is possible to close the butting section of the second seal ring, and thereby it is possible to prevent lubricant oil having leaked through the butting section of the first seal ring from leaking out toward the impeller through the butting section of the second seal ring.

(7) A supercharger according to at least one embodiment of the present invention comprises the seal structure according to any one of the above (1) to (6).

(8) A seal structure according to at least one embodiment of the present invention is for a supercharger including a rotary shaft, an impeller disposed on an end portion of the rotary shaft, and a bearing housing which accommodates a bearing for rotatably supporting the rotary shaft, the seal structure being provided to seal clearance between an outer peripheral surface of the rotary shaft and an inner peripheral surface of the bearing housing, and comprises: a first seal groove of an annular shape, formed on the outer peripheral surface of the rotary shaft and between the impeller and the bearing with respect to an axial direction of the rotary shaft; a second seal groove of an annular shape, formed on the outer peripheral surface of the rotary shaft and between the impeller and the bearing with respect to the axial direction of the rotary shaft, and disposed between the first seal groove and the impeller; a first seal ring to be mounted to the first seal groove; a second seal ring to be mounted to the second seal groove; and a housing-side stepped portion formed on the inner peripheral surface of the bearing housing. The housing-side stepped portion is configured to contact an edge surface of the second seal ring, in a state where the edge surface of the second seal ring is in contact with a bearing-side wall surface of the second seal groove.

According to the seal structure described in the above (8), the seal structure includes two rings, the first seal ring mounted to the first seal groove and the second seal ring mounted to the second seal groove, and the housing-side stepped portion is configured to contact the edge surface of the second seal ring disposed on the side of the impeller, in a state where the edge surface of the second seal ring is in contact with a bearing-side wall surface of the second seal groove.

Thus, the second seal ring is pressed against the housing-side stepped portion of the inner peripheral surface of the bearing housing when pressed against the bearing-side wall surface of the second seal groove by high-pressure gas from the impeller. Thus, a pressing force applied to the second seal ring is dispersed, and thereby a pressing force that presses the second seal ring against the bearing-side wall surface of the second seal groove is reduced. Accordingly, it is possible to reduce wear of the second seal ring.

Furthermore, the housing-side stepped portion of the inner peripheral surface of the bearing housing is configured to contact the second seal ring even before the second seal ring gets worn. Thus, an effect to reduce wear of the second seal ring can be exerted even before the second seal ring gets worn, and thereby it is possible to minimize generation of abrasion powder, as compared to the typical technique of Patent Document 2 described above.

(9) In some embodiments, in the above seal structure (8), each of the first seal ring and the second seal ring comprises a seal-ring strip processed into a ring shape, and a butting section at which opposite end surfaces of the seal-ring strip face each other via a gap. Further, when the first seal ring and the second seal ring are respectively mounted to the first seal groove and the second seal groove, the butting section of the first seal ring and the butting section of the second seal ring are disposed at an interval in the circumferential direction from each other.

With the seal structure described in the above (9), the butting section of the first seal ring and the butting section of the second seal ring are disposed at an interval in the circumferential direction, and thereby it is possible to reduce leakage of a fluid through the butting section of one of the seal rings after the fluid leaks out through the butting section of the other one of the seal rings.

(10) In some embodiments, in the above seal structure (9), the butting section of the first seal ring and the butting section of the second seal ring are disposed at an interval of half a circumference in the circumferential direction from each other.

With the seal structure described in the above (10), the butting section of the first seal ring and the butting section of the second seal ring are disposed at an interval of half a circumference in the circumferential direction, and thereby it is possible to reduce leakage of a fluid through the butting section of one of the seal rings after the fluid leaks out through the butting section of the other one of the seal rings effectively.

(11) In some embodiments, in the above seal structure (9), the gap of the butting section of the first seal ring in a state where the first seal ring is mounted to the first seal groove is greater than the gap of the butting section of the second seal ring in a state where the second seal ring is mounted to the second seal groove.

With the seal structure described in the above (11), with the opening of the butting section of the first seal ring disposed on the side of the bearing being larger than the opening of the butting section of the second seal ring, it is possible to promote leakage of lubricant oil on the side of the bearing through the butting section of the first seal ring. Lubricant oil having leaked through the butting section of the first seal ring enters the clearance between the bearing-side wall surface of the second seal groove and the second seal ring, and reduces friction between the bearing-side wall surface of the second seal groove and the second seal ring. Accordingly, it is possible to reduce wear of the second seal ring.

(12) In some embodiments, in the above seal structure (11), the first seal ring includes, in a state in which the first seal ring is mounted to the first seal groove, a first-seal body portion mounted to the first seal groove, and a butting closing portion which is protruding toward the second seal ring mounted to the second seal groove and which is configured to fit into the butting section of the second seal ring.

With the seal structure described in the above (12), the first seal ring has the butting-closing portion configured to fit into the butting section of the second seal ring. With the butting-closing portion fitted into the butting section of the second seal ring, it is possible to close the butting section of the second seal ring, and thereby it is possible to prevent lubricant oil having leaked through the butting section of the first seal ring from leaking out toward the impeller through the butting section of the second seal ring.

(13) A supercharger according to at least one embodiment of the present invention comprises the seal structure according to any one of the above (8) to (12).

(14) A seal structure according to at least one embodiment of the present invention is for a supercharger including a rotary shaft, an impeller disposed on an end portion of the rotary shaft, and a bearing housing which accommodates a bearing for rotatably supporting the rotary shaft, the seal structure being provided to seal clearance between an outer peripheral surface of the rotary shaft and an inner peripheral surface of the bearing housing, and comprises: a first seal groove of an annular shape, formed on the outer peripheral surface of the rotary shaft and between the impeller and the bearing with respect to an axial direction of the rotary shaft; a second seal groove of an annular shape, formed on the outer peripheral surface of the rotary shaft and between the impeller and the bearing with respect to the axial direction of the rotary shaft, and disposed between the first seal groove and the impeller; a first seal ring to be mounted to the first seal groove; and a second seal ring to be mounted to the second seal groove. Each of the first seal ring and the second seal ring comprises a seal-ring strip processed into a ring shape, and a butting section at which opposite end surfaces of the seal-ring strip face each other via a gap. The butting section of the first seal ring and the butting section of the second seal ring are disposed at an interval in the circumferential direction from each other, in a state in which the first seal ring and the second seal ring are respectively mounted to the first seal groove and the second seal groove. The gap of the butting section of the first seal ring in a state where the first seal ring is mounted to the first seal groove is greater than the gap of the butting section of the second seal ring in a state where the second seal ring is mounted to the second seal groove.

According to the seal structure described in the above (14), the seal structure includes two seal rings, the first seal mounted to the first seal groove and the second seal ring mounted to the second seal groove, and the opening of the butting section of the first seal ring disposed on the side of the bearing is larger than the opening of the butting section of the second seal ring disposed on the side of the impeller. Thus, it is possible to promote leakage of lubricant oil of the side of the bearing through the butting section of the first seal ring.

Lubricant oil having leaked through the butting section of the first seal ring enters the clearance between the bearing-side wall surface of the second seal groove and the second seal ring, and reduces friction between the bearing-side wall surface of the second seal groove and the second seal ring. Accordingly, it is possible to suppress wear of the second seal ring caused by high-pressure gas from the impeller pressing the second seal ring against the bearing-side wall surface of the second seal groove.

Further, the butting section of the first seal ring and the butting section of the second seal ring are disposed at an interval in the circumferential direction from each other, and thereby it is possible to reduce leakage of a fluid through the butting section of one of the seal rings after the fluid leaks out through the butting section of the other one of the seal rings. In particular, it is possible to effectively suppress leakage of lubricant oil having leaked through the butting section of the first seal ring toward the impeller through the butting section of the second seal ring.

(15) In some embodiments, in the above seal structure (14), the butting section of the first seal ring and the butting section of the second seal ring are disposed at an interval of half a circumference in the circumferential direction from each other.

With the seal structure described in the above (15), the butting section of the first seal ring and the butting section of the second seal ring are disposed at an interval of half a circumference in the circumferential direction from each other, and thereby it is possible to reduce leakage of a fluid through the butting section of one of the seal rings after the fluid leaks out through the butting section of the other one of the seal rings effectively. In particular, it is possible to effectively suppress leakage of lubricant oil having leaked through the butting section of the first seal ring toward the impeller through the butting section of the second seal ring.

(16) In some embodiments, in the above seal structure (14), the first seal ring includes, in a state in which the first seal ring is mounted to the first seal groove, a first-seal body portion mounted to the first seal groove, and a butting closing portion which is protruding toward the second seal ring mounted to the second seal groove and which is configured to fit into the butting section of the second seal ring.

With the seal structure described in the above (16), the first seal ring has the butting-closing portion configured to fit into the butting section of the second seal ring. With the butting-closing portion fitted into the butting section of the second seal ring, it is possible to close the butting section of the second seal ring, and thereby it is possible to prevent lubricant oil having leaked through the butting section of the first seal ring from leaking out toward the impeller through the butting section of the second seal ring.

(17) A supercharger according to at least one embodiment of the present invention comprises the seal structure according to any one of the above (14) to (16).

Advantageous Effects

According to at least one embodiment of the present invention, it is possible to provide a seal structure capable of reducing wear of a seal ring without increasing the number of components, and of minimizing generation of abrasion powder, as well as a supercharger provided with the seal structure.

BRIEF DESCRIPTION OF DRAWINGS

FIG. 3 is an enlarged view of section "a" in FIG. 1 and its peripheral structure, showing a cross-sectional view of another embodiment of a seal structure according to the first embodiment of the present invention.

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
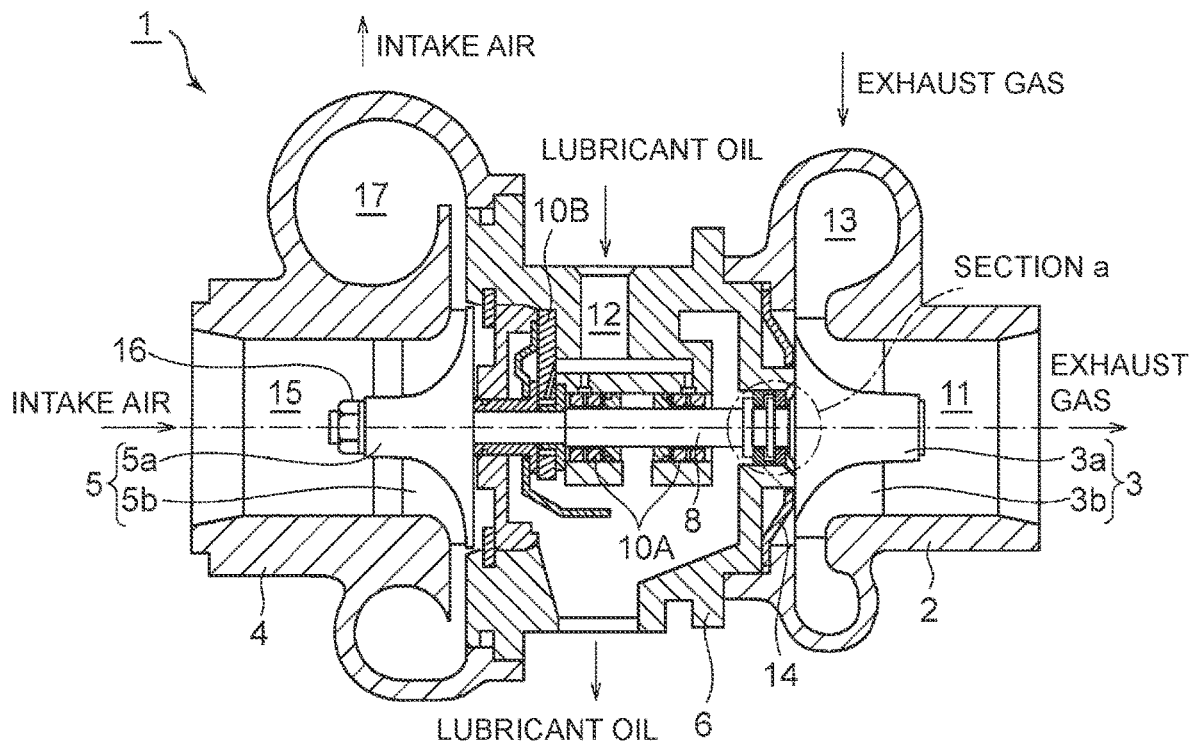
FIG. 1 is a cross-sectional view of a turbocharger illustrated as an example of a supercharger according to an embodiment of the present invention.

FIG. 1 is a cross-sectional view of a turbocharger illustrated as an example of a supercharger according to an embodiment of the present invention.

As depicted in FIG. 1, the turbocharger 1 of the present embodiment includes three housings: a turbine housing 2 which accommodates a turbine impeller 3 disposed on one end side of a rotary shaft 8; a compressor housing 4 which accommodates a compressor impeller 5 disposed on the opposite end side of the rotary shaft 8; and a bearing housing 6 which accommodates a bearing 10A for rotatably supporting the rotary shaft 8 and a bearing 10B (thrust bearing 10B) for supporting a thrust force of the rotary shaft 8.

A turbine scroll passage 13 of a spiral shape is disposed on an outer peripheral part of the turbine housing 2. The turbine impeller 3 is disposed at the center of the turbine scroll passage 13. The turbine impeller 3 includes a turbine hub 3a of a truncated conical shape, which is a conical member with its top portion cut off along a plane parallel to its bottom surface, and a plurality of turbine blades 3b protruding in a radial direction from a peripheral surface of the turbine hub 3a. The turbine hub 3a of the turbine impeller 3 is joined to an end portion of the rotary shaft 8 by, for instance, welding. Exhaust gas flows through the turbine scroll passage 13 to act on the turbine impeller 3, and exits the turbine housing 2 through an exhaust-gas outlet 11 which has an opening in the axial direction of the rotary shaft 8.

A compressor scroll passage 17 of a spiral shape is disposed on an outer peripheral part of the compressor housing 4. The compressor impeller 5 is disposed at the center of the compressor scroll passage 17. The compressor impeller 5 includes a compressor hub 5a of a truncated conical shape, which is a conical member with its top portion cut off along a plane parallel to its bottom surface, and a plurality of compressor blades 5b protruding in a radial direction from a peripheral surface of the compressor hub 5a. An insertion hole (not depicted) is formed in the center of the compressor hub 5a of the compressor impeller 5, and the second end side of the rotary shaft 8 is to be fitted into the insertion hole. The first end side of the rotary shaft 8 is fitted through the insertion hole, and then a nut 16 is fastened from a distal end of the compressor hub 5a, and thereby the compressor impeller 5 is fixed to the second end portion of the rotary shaft 8. Intake gas flows through an intake inlet 15 which has an opening in the axial direction of the rotary shaft 8, is compressed by the compressor impeller 5, and flows through the compressor scroll passage 17 to be supplied to an engine (not depicted).

The bearing housing 6 is coupled to the turbine housing 2 and to the compressor housing 4 at the opposite sides, and is held between the turbine housing 2 and the compressor housing 4. An interior space is defined inside the bearing housing 6 so that the rotary shaft 8 is insertable in the axial direction through the interior space, and the above described bearings 10A, 10B are accommodated in the interior space. Further, a lubricant-oil channel 12 for supplying the above described bearings 10A, 10B with lubricant oil is formed in the bearing housing 16.

A back plate 14 is fixed to a coupling section between the bearing housing 6 and the turbine housing 2. The back plate 14 has a disc shape with an opening formed in the center, and the rotary shaft 8 is inserted through the opening. The back plate 14 is disposed so that a peripheral portion around the opening is proximate to a back surface of the turbine impeller 3, thereby preventing exhaust gas flowing toward the turbine impeller 3 from the turbine scroll passage 13 from flowing toward the back-surface side of the turbine impeller 3.

The turbocharger 1 includes a seal structure at section "a" indicated in FIG. 1. The seal structure seals clearance between an outer peripheral surface 8a of the rotary shaft 8 and an inner peripheral surface 6a of the bearing housing 6 to prevent leakage of lubricant oil supplied to the bearings 10A, 10B along the rotary shaft 8, as well as to prevent leakage of exhaust gas along the rotary shaft 8 through clearance between the back plate 14 and the back surface of the turbine impeller 3.

First Embodiment

Figure 2:
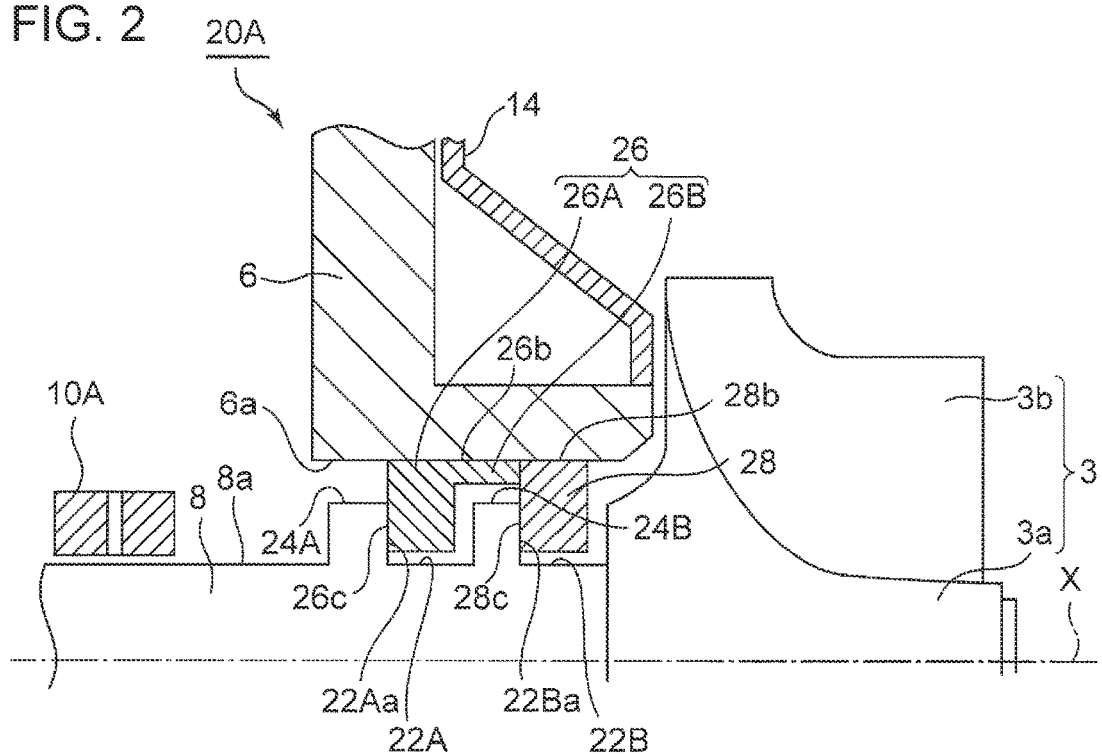
FIG. 2 is an enlarged view of section "a" in FIG. 1 and its peripheral structure, showing a cross-sectional view of an embodiment of a seal structure according to the first embodiment of the present invention.

FIGS. 2 and 3 are enlarged views of section "a" in FIG. 1 and its peripheral structure, showing a cross-sectional view of a seal structure according to the first embodiment of the present invention.

As depicted in FIGS. 2 and 3, a seal structure 20A of the present embodiment includes the first seal groove 22A and the second seal groove 22B formed on the outer peripheral surface 8a of the rotary shaft 8, as well as the first seal ring 26 mounted to the first seal groove 22A and the second seal ring 28 mounted to the second seal groove 22B.

The first seal groove 22A and the second seal groove 22B are disposed between the turbine impeller 3 and the bearing 10A, with respect to the axial direction X of the rotary shaft 8. While the two seal grooves are provided, the first seal groove 22A is disposed on the side of the bearing 10A, and the second seal groove 22B is disposed on the side of the turbine impeller 3.

In the embodiment depicted in FIG. 2, the first projecting portion 24A and the second projecting portion 24B both having an annular shape are disposed on the outer peripheral surface 8a of the rotary shaft 8 along the circumferential direction. The first seal groove 22A is defined between the first projecting portion 24A disposed on the side of the bearing 10A and the second projecting portion 24B disposed on the side of the turbine impeller 3. The second seal groove 22B is defined between the second projecting portion 24B disposed on the side of the turbine impeller 3 and the back surface of the turbine hub 3a.

Further, the first seal groove 22A has a bearing-side wall surface 22Aa, which will be described below, constituted of a side surface of the first projecting portion 24A that is on the side of the turbine impeller 3. The second seal groove 22B has a bearing-side wall surface 22Ba, which will be described below, constituted of a side surface of the second projecting portion 24B that is on the side of the turbine impeller 3.

In contrast, in the embodiment depicted in FIG. 3, the first projecting portion 24A and the second projecting portion 24B described above are not formed on the outer peripheral surface 8a of the rotary shaft 8. Instead, the first seal groove 22A and the second seal groove 22B are respectively constituted of the first recess portion 23A and the second recess portion 23B provided as dents on the outer peripheral surface 8a of the rotary shaft 8. While the two recess portions are provided, the first recess portion 23A is disposed on the side of the bearing 10A, and the second recess portion 23B is disposed on the side of the turbine impeller 3.

Further, the first seal groove 22A has the bearing-side wall surface 22Aa, which will be described below, constituted of a side surface of the recess portion on the side of the bearing 10A. The second seal groove 22B has the bearing-side wall surface 22Ba, which will be described below, constituted of a side surface of the recess portion on the side of the bearing 10A.

Figure 4A:
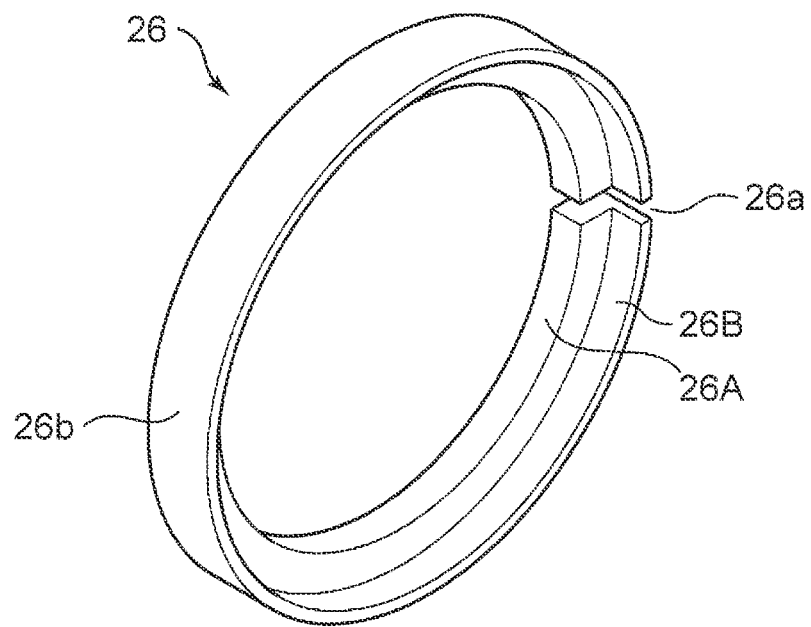
FIGS. 4A and 4B are perspective views showing the first seal ring and the second seal ring, respectively.
Figure 4B:
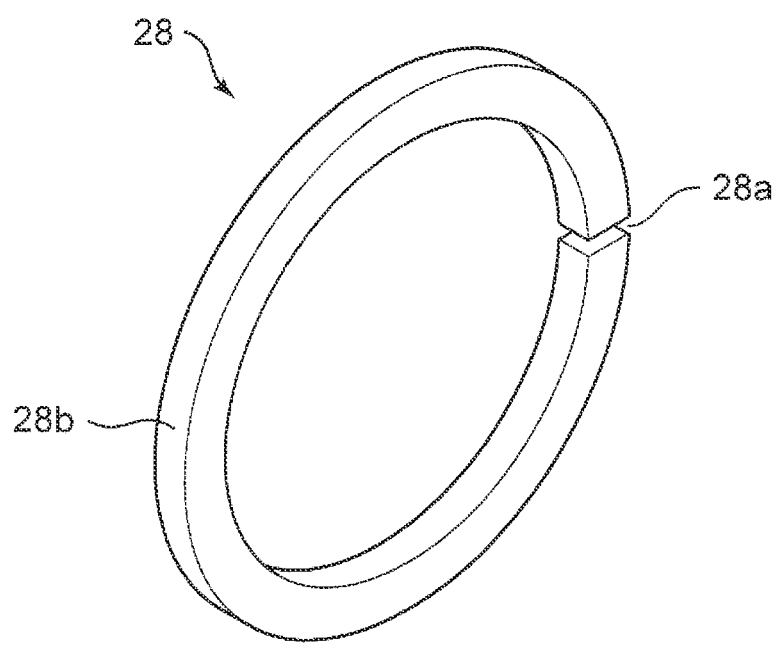

FIGS. 4A and 4B are perspective views showing the first seal ring and the second seal ring, respectively. FIG. 4A is a view of the first seal ring 26, and FIG. 4B is a view of the second seal ring 28. The first seal ring 26 and the second seal ring 28 each include a seal-ring strip processed into a ring shape as depicted in FIGS. 4A and 4B, and have butting sections 26a, 28a at which opposite end surfaces the seal-ring strip face each other via a gap.

Each of the first seal ring 26 and the second seal ring 28 is mounted to corresponding one of the first seal groove 22A and the second seal groove 22B formed on the outer peripheral surface 8a of the rotary shaft 8 by spreading the respective butting sections 26a, 28a. Accordingly, the respective outer peripheral surface 26b, 28b of the first seal ring 26 and the second seal ring 28 contact the inner peripheral surface 6a of the bearing housing 6 due to elasticity of the seal rings.

While materials of the first seal ring 26 and the second seal ring 28 are not particularly limited, and a suitable material may be selected in accordance with a usage environment, a material with a high lubricating property is preferable. For instance, in a low-temperature environment, a resin material with high self-lubricating performance may be used. On the other hand, in a high-temperature environment, a sintered compact such as ceramics may be sued.

The first seal ring 26 and the second seal ring 28 mounted to the first seal groove 22A and the second seal groove 22B are subject to action of high-pressure exhaust gas that leaks through the clearance between the back surface of the turbine impeller 3 and the back plate 14. Accordingly, an edge surface 26c of the first seal ring 26 contacts the bearing-side wall surface 22Aa of the first seal groove 22A, and an edge surface 28c of the second seal ring 28 contacts the bearing-side wall surface 22Ba of the second seal groove 22B. As a result, the clearance between the outer peripheral surface 8a of the rotary shaft 8 and the inner peripheral surface 6a of the bearing housing 6 is sealed.

Furthermore, as depicted in FIGS. 2 and 3, the first seal ring 26 of the seal structure 20A of the present embodiment includes the first-seal body portion 26A mounted to the first seal groove 22A, and the first-seal protruding portion 26B protruding from the first-seal body portion 26A toward the second seal ring 28 mounted to the second seal groove 22B, in a state where the first seal ring 26 is mounted to the first seal groove 22A. The first-seal protruding portion 26B is configured to contact the second seal ring 28 in a state of contacting the bearing-side wall surface 28c of the second seal groove 22B, in a state where the first-seal body portion 26A is in contact with the bearing-side wall surface 26c of the first seal groove 22A.

In the depicted embodiment, the first-seal body portion 26A has a square cross section or a rectangular cross section that is close to a square, while the first-seal protruding portion 26B has a narrow rectangular cross section whose long sides extend along the axial direction X of the rotary shaft 8. Further, the first-seal protruding portion 26B is formed so as not to form a stepped portion with the first-seal body portion 26A on the outer peripheral surface of the first-seal protruding portion 26B. In other words, the first seal ring 26 has an outer peripheral surface 26b that is smooth and continuous from the first-seal body portion 26A to the first-seal protruding portion 26B. Accordingly, the first seal ring 26 has an L-shape cross section as a whole.

In contrast, the second seal ring 28 has a square cross section or a nearly-square rectangular cross section.

With the seal structure 20A of the present embodiment having the above configuration, a distal end portion of the first-seal protruding portion 26B of the first seal ring 26 contacts the second seal ring 28 when the second seal ring 28 is pressed against the bearing-side wall surface 22Ba of the second seal groove 22B by high-pressure gas from the turbine impeller 3, and thereby a pressing force that presses the second seal ring 28 against the bearing-side wall surface 28c of the second seal groove 22B is reduced. Accordingly, it is possible to reduce wear of the second seal ring 28.

Furthermore, the first-seal protruding portion 26B is configured to contact the second seal ring 28 even before the second seal ring 28 gets worn. That is, in the illustrated embodiment, the width of the first seal ring 26, which is the total width of the first-seal body portion 26A and the first-seal protruding portion 26B, is equal to a distance between the bearing-side wall surface 22Aa of the first seal groove 22A and the bearing-side wall surface 22Ba of the second seal groove 22B. Thus, an effect to reduce wear of the second seal ring 28 can be exerted even before the second seal ring 28 gets worn, and thereby it is possible to minimize generation of abrasion powder.

Figure 5:
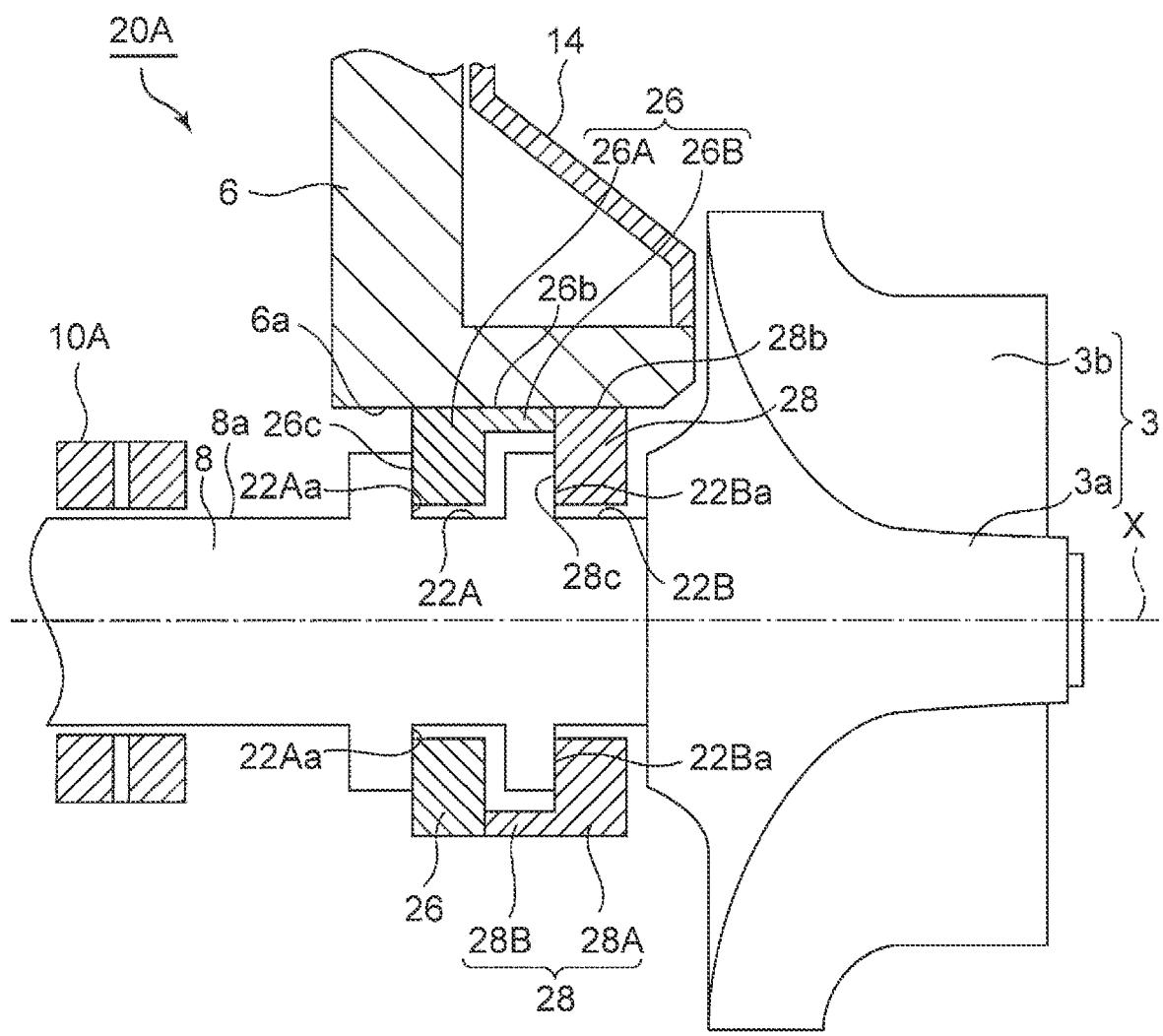
FIG. 5 is an enlarged view of section "a" in FIG. 1 and its peripheral structure, showing a cross-sectional view of another seal structure according to the first embodiment of the present invention.

FIG. 5 is an enlarged view of section "a" in FIG. 1 and its peripheral structure, showing a cross-sectional view of another seal structure according to the first embodiment of the present invention.

Figure 6A:
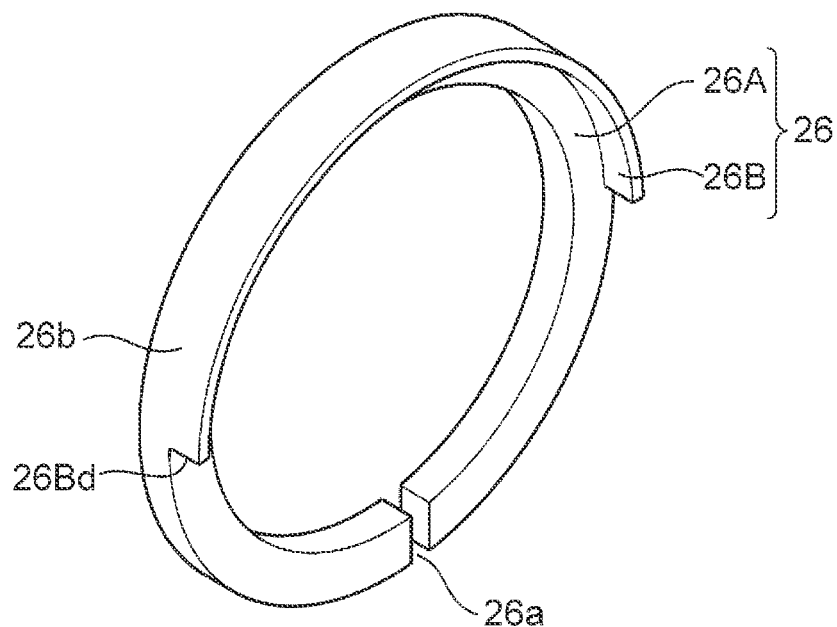
FIGS. 6A and 6B are perspective views showing another first seal ring and second seal ring according to the first embodiment of the present invention, respectively.
Figure 6B:
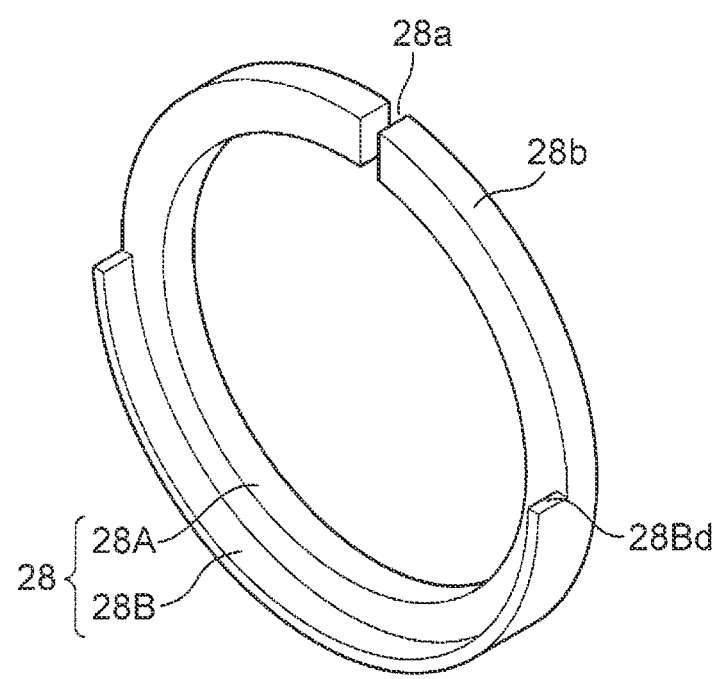

FIGS. 6A and 6B are perspective views showing another first seal ring and second seal ring according to the first embodiment of the present invention, respectively. FIG. 6A is a view of the first seal ring 26, and FIG. 6B is a view of the second seal ring 28.

In some embodiments, as depicted in FIG. 5 and similarly to the first seal ring 26 described above, the second seal ring 28 includes, in a state where the second seal ring 28 is mounted to the second seal groove 28B, the second-seal body portion 28A mounted to the second seal groove 22B, and the second-seal protruding portion 28B protruding from the second-seal body portion 28A toward the first seal ring 26 mounted to the first seal groove 22A and being configured to contact the first seal ring 26 contacting the bearing-side wall surface 22Aa of the first seal groove 22A in a state where the second-seal body portion 28A is in contact with the bearing-side wall surface 22Ba of the second seal groove 22B. As depicted in FIG. 6, the first-seal protruding portion 26B of the first seal ring 26 is formed continuously over half a circumference of the first seal ring 26 in the circumferential direction. The second-seal protruding portion 28B of the second seal ring 28 is formed continuously over half a circumference of the second seal ring 28 in the circumferential direction. In a state where the first seal ring 26 and the second seal ring 28 are respectively mounted to the first seal groove 22A and the second seal groove 22B, the first-seal protruding portion 26B of the first seal ring 26 contacts the second-seal body portion 28A of the second seal ring 28, and the second-seal protruding portion 28B of the second seal ring 28 contacts the first-seal body portion 26A of the first seal ring 26.

According to this embodiment, similarly to the above described embodiment, a pressing force that presses the second seal ring 28 against the bearing-side wall surface 28c of the second seal groove 22B is reduced, and thereby it is possible to suppress wear of the second seal ring 28.

Figure 7:
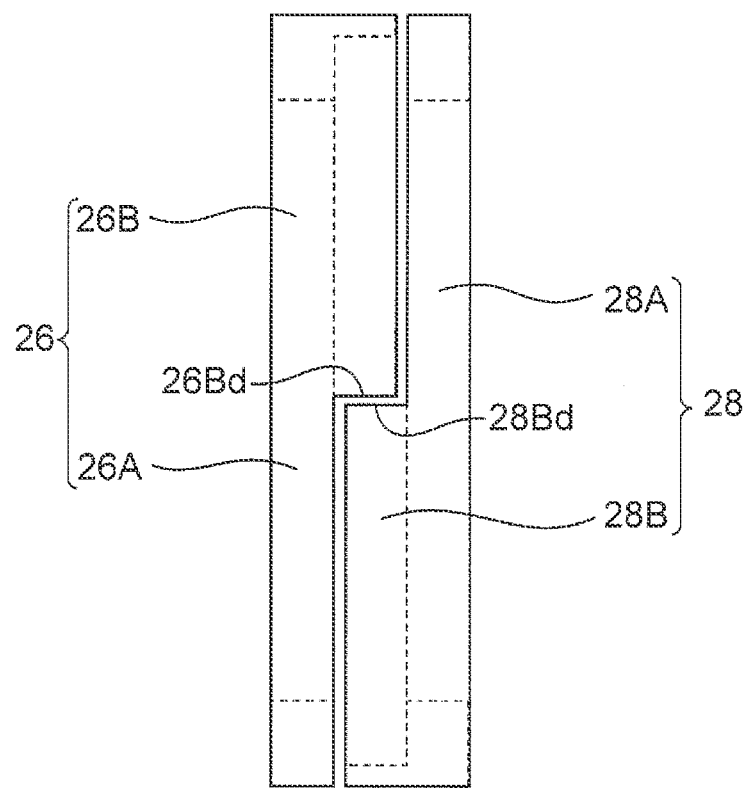
FIG. 7 is a side view showing another first seal ring and second seal ring according to the first embodiment of the present invention in an assembled state.

Further, the first-seal protruding portion 26B of the first seal ring 26 and the second-seal protruding portion 28B of the second seal ring 28 are each formed continuously over half a circumference in the circumferential direction. Accordingly, as depicted in FIG. 7, two circumference-end surfaces 26Bd, 26Bd of the first-seal protruding portion 26B of the first seal ring 26 are disposed so as to face two circumference-end surfaces 28Bd, 28Bd of the second-seal protruding portion 28B of the second seal ring 28. Thus, even if the first seal ring 26 and the second seal ring 28 revolve following the rotary shaft 8, the relative phase in the circumferential direction of the two seal rings does not change. Accordingly, it is possible to prevent the respective butting sections 26a, 28a of the first seal ring 26 and the second seal ring 28 from being positioned at the same phase in the circumferential direction.

In some embodiments, the first seal ring 26 and the second seal ring 28 described above have the same shape.

According to this embodiment, the two seal rings 26, 28 have the same shape and thus it is sufficient if only one kind of seal rings is produced, which makes it possible to reduce production cost as compared to a case in which two kinds of seal rings varied in shape are produced. Further, during arrangement of seal rings, one should take care of only the direction in which seal rings are to be set, and thereby it is possible to prevent wrong combination of seal rings.

Figure 8A:
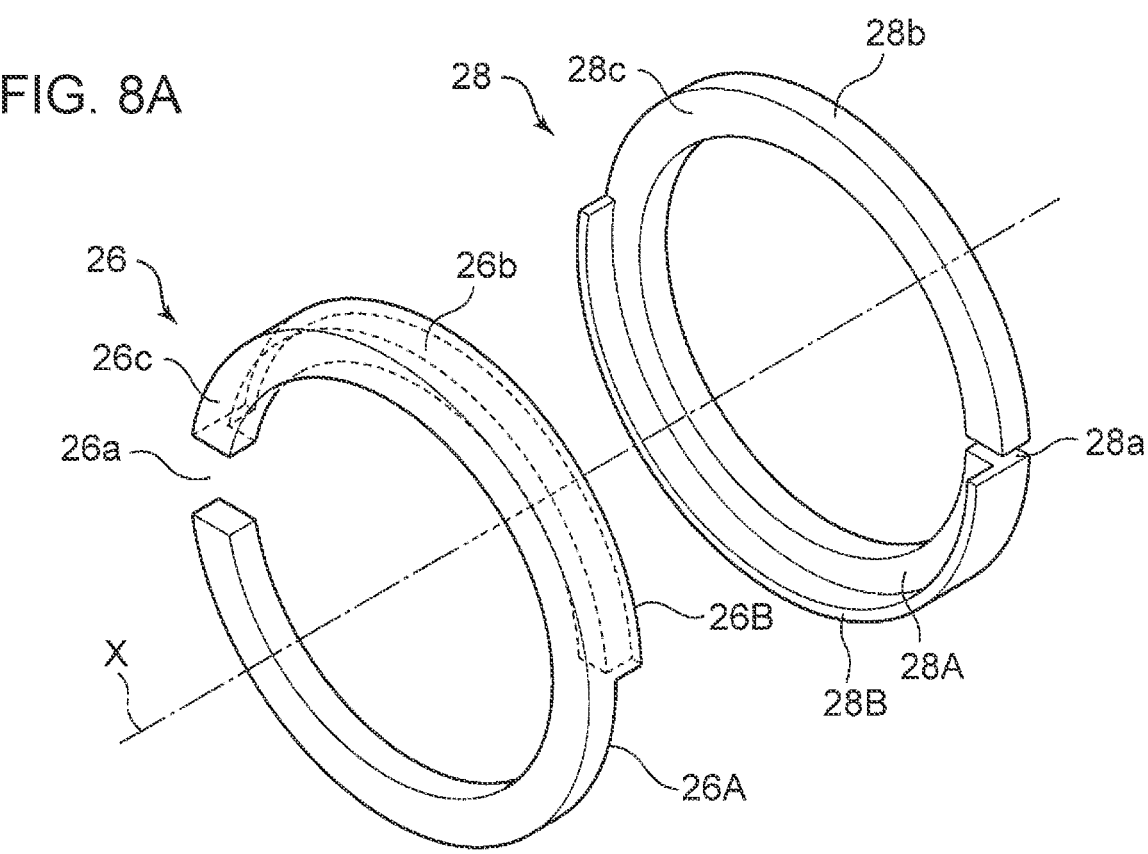
FIGS. 8A and 8B are exploded perspective views showing another first seal ring and second seal ring according to the first embodiment of the present invention in a pre-assembly state.
Figure 8B:
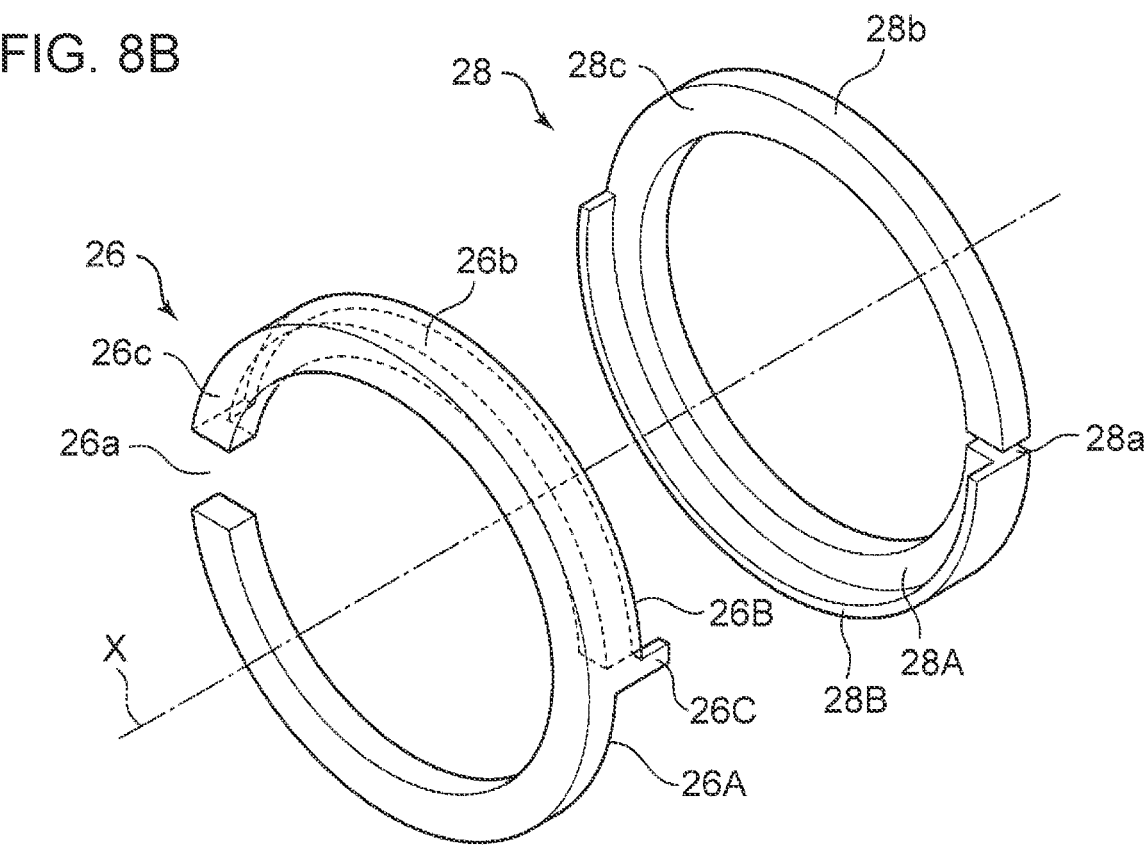

FIGS. 8A and 8B are exploded perspective views showing another first seal ring and second seal ring according to the first embodiment of the present invention in a pre-assembly state.

In some embodiments, as described above, the first seal ring 26 and the second seal ring 28 respectively have the butting sections 26a, 28a, at which the opposite end surfaces of the seal-ring strip processed in a ring shape face each other via a gap. Further, as depicted in FIG. 8, when the first seal ring 26 and the second seal ring 28 are respectively mounted to the first seal groove 22A and the second seal groove 22B, the butting section 26a of the first seal ring and the butting section 28a of the second seal ring are disposed at an interval of half a circumference in the circumferential direction from each other.

Herein, "disposed at an interval of half a circumference" does not mean that the center of the butting section 26a of the first seal ring 26 and the center of the butting section 28a of the second seal ring 28 are precisely 180° apart from each other. When the center of the butting section 26a of the first seal ring 26 and the center of the butting section 28a of the second seal ring 28 are disposed at an interval of 160°-200°, they are still "disposed at an interval of half a circumference" in the present specification.

According to this embodiment, the butting section 26a of the first seal ring 26 and the butting section 28a of the second seal ring 28 are disposed at an interval of half a circumference in the circumferential direction from each other. Further, the above configuration makes it possible to maintain the relative phase difference between the first seal ring 26 and the second seal ring 28 even if the first seal ring 26 and the second seal ring 28 revolve following the rotary shaft 8. In other words, the butting section 26a of the first seal ring 26 and the butting section 28a of the second seal ring 28 are always disposed at an interval of half a circumference in the circumferential direction from each other. Accordingly, it is possible to reduce leakage of a fluid through the butting section of one of the seal rings after the fluid leaks out thorough the butting section of the other one of the seal rings.

In some embodiments, as depicted in FIG. 8A, the opening of the butting section 26a of the first seal ring 26 when the first seal ring 26 is mounted to the first seal groove 22A is greater than the opening of the butting section 28a of the second seal ring 28 when the second seal ring 28 is mounted to the second seal groove 22B.

The first seal ring 26 disposed on the side of the bearing 10A has a sealing function mainly to prevent leakage of lubricant oil of the bearing 10A toward the turbine impeller 3. On the other hand, the second seal ring 28 disposed on the side of the turbine impeller 3 has a sealing function mainly to prevent leakage of high-pressure gas toward the bearing 10A.

Thus, according to the above embodiment, with the opening of the butting section 26a of the first seal ring 26 disposed on the side of the bearing 10A being larger than the opening of the butting section 28a of the second seal ring 28, it is possible to promote leakage of lubricant oil on the side of the bearing 10A through the butting section 26a of the first seal ring 26. Lubricant oil having leaked through the butting section 26a of the first seal ring 26 enters the clearance between the bearing-side wall surface 22Ba of the second seal groove 22B and the edge surface 28c of the second seal ring 28, and reduces friction between the bearing-side wall surface 22Ba and the edge surface 28c of the second seal ring 28. Accordingly, it is possible to reduce wear of the second seal ring 28 even further.

In some embodiments, as depicted in FIG. 8B, the first seal ring 26 further includes a butting-closing portion 26C which protrudes toward the second seal ring 28 mounted to the second seal groove 22B and which is configured to fit into the butting section 28a of the second seal ring 28, in a state where the first seal ring 26 is mounted to the first seal groove 22A. In the depicted embodiment, the butting-closing portion 26C is formed at an interval of half a circumference from the butting section 26a in the circumferential direction.

According to this embodiment, the first seal ring 26 has the butting-closing portion 26C configured to fit into the butting section 28a of the second seal ring 28. With the butting-closing portion 26C fitted into the butting section 28a of the second seal ring 28, it is possible to close the butting section 28a of the second seal ring 28. Accordingly, it is possible to prevent lubricant oil having leaked through the butting section 26a of the first seal ring 26 from leaking out toward the turbine impeller 3 through the butting section 28a of the second seal ring 28.

Second Embodiment

Figure 9:
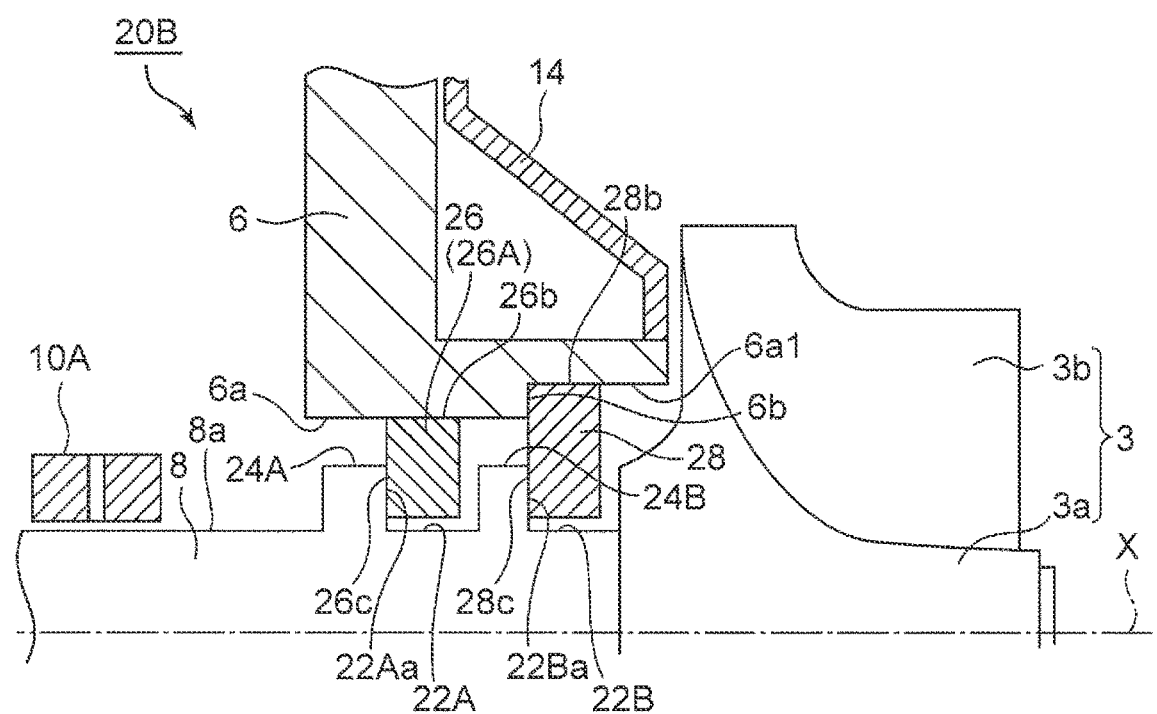
FIG. 9 is an enlarged view of section "a" in FIG. 1 and its peripheral structure, showing a cross-sectional view of a seal structure according to the second embodiment of the present invention.

FIG. 9 is an enlarged view of section "a" in FIG. 1 and its peripheral structure, showing a cross-sectional view of a seal structure according to the second embodiment of the present invention.

A seal structure 20B of the present embodiment has some features similar to those of the seal structure 20A of the above-described first embodiment. Thus, the same components as those in the seal structure 20A of the first embodiment are associated with the same reference numerals and not described again in detail.

The first seal ring 26 of the present embodiment is different from that in the first embodiment in that there is no first-seal protruding portion 26B formed. The first seal ring 26 of the present embodiment includes only the first-seal body portion 26A corresponding to the seal ring 26 of the above described first embodiment.

Further, the inner peripheral surface 6a of the bearing housing 6 has a dent that faces the second seal groove 22B and constitutes a stepped surface 6a1 at which a distance from the outer peripheral surface 8a of the rotary shaft 8 increases. A housing-side stepped portion 6b is formed between the stepped surface 6a1 and the inner peripheral surface 6a on the side of the bearing 10A.

As depicted in FIG. 9, the seal structure 20B of the present embodiment includes the first seal groove 22A and the second seal groove 22B formed on the outer peripheral surface 8a of the rotary shaft 8, the first seal ring 26 mounted to the first seal groove 22A and the second seal ring 28 mounted to the second seal groove 22B, and the above described housing-side stepped portion 6b formed on the inner peripheral surface 6a of the bearing housing 6. The housing-side stepped portion 6b is configured to contact the edge surface 28c of the second seal ring 28 in a state where the edge surface 28c of the second seal ring 28 is in contact with the bearing-side wall surface 22Ba of the second seal groove 22B.

Further, the second seal ring 28 is longer than the first seal ring 26 in cross section in a direction orthogonal to the axial direction X of the rotary shaft 8. Further, the outer peripheral surface 28b of the second seal ring 28 is in contact with the stepped surface 6a1 of the bearing housing 6.

The first seal ring 26 has a cross section similar to that in the above embodiment, and the outer peripheral surface 26b of the first seal ring 26 is in contact with the inner peripheral surface 6a of the bearing housing 6.

With the seal structure 20B of the present embodiment having the above configuration, the second seal ring 28 is pressed against the housing-side stepped portion 6b of the inner peripheral surface 6a of the bearing housing 6 when pressed against the bearing-side wall surface 22Ba of the second seal groove 22B by high-pressure gas from the turbine impeller 3. Thus, a pressing force applied to the second seal ring 28 is dispersed, and thereby a pressing force that presses the second seal ring 28 against the bearing-side wall surface 22Ba of the second seal groove 22B is reduced. Accordingly, it is possible to reduce wear of the second seal ring 28.

Furthermore, the housing-side stepped portion 6b of the inner peripheral surface 6a of the bearing housing 6 is configured to contact the second seal ring 28 even before the second seal ring 28 gets worn. Specifically, in the depicted embodiment, the edge surface 28c of the second seal ring 28 extends in a direction orthogonal to the axial direction X, and the bearing-side wall surface 22Ba of the second seal groove 22B and the housing-side stepped portion 6b are formed on the same position with respect to the axial direction X. Thus, an effect to reduce wear of the second seal ring 28 is exerted even before the second seal ring 28 gets worn, and thereby it is possible to minimize generation of abrasion powder.

Figure 10A:
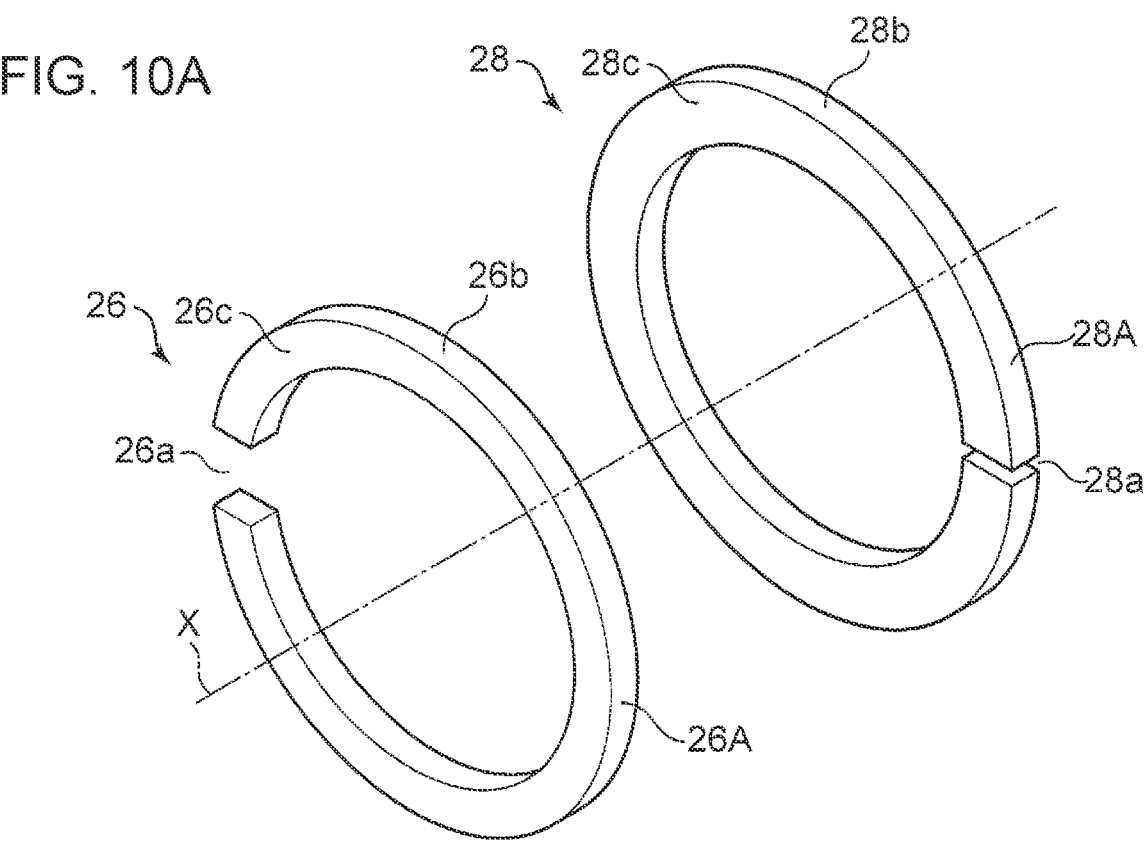
FIGS. 10A and 10B are exploded perspective views showing another first seal ring and second seal ring according to the second embodiment of the present invention in a pre-assembly state.
Figure 10B:
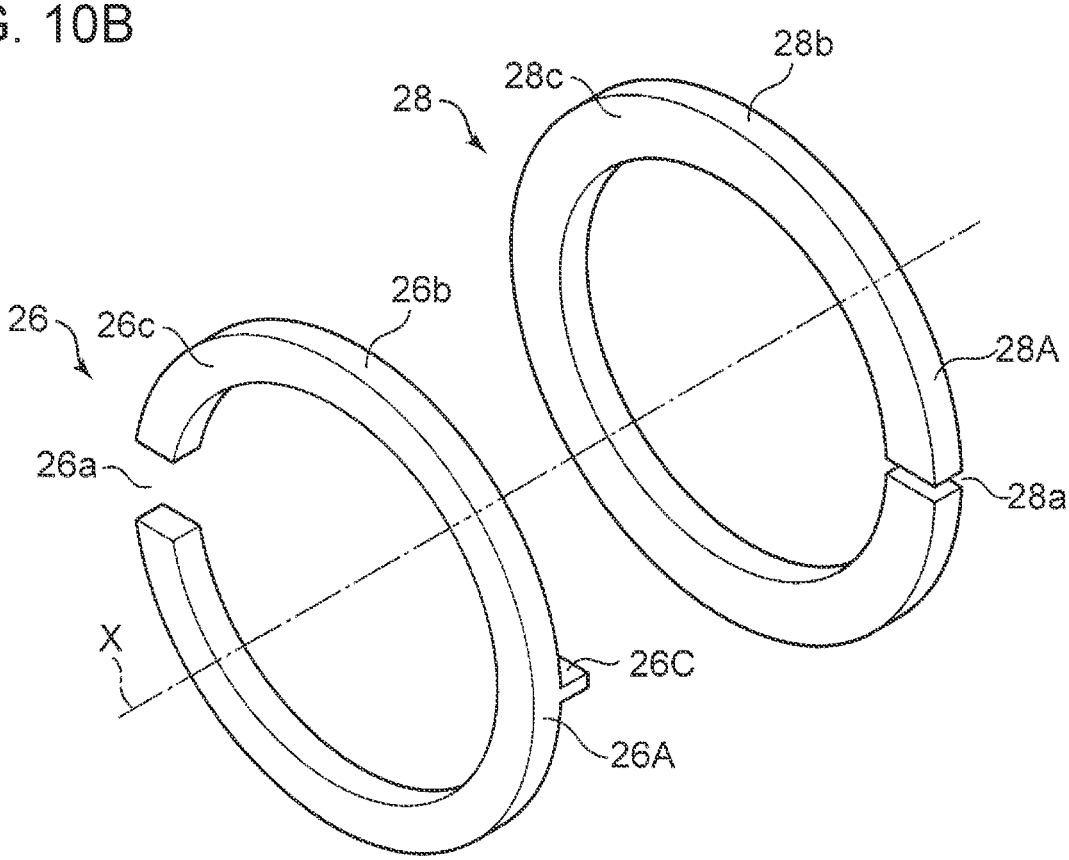

FIGS. 10A and 10B are exploded perspective views showing another first seal ring and second seal ring according to the second embodiment of the present invention in a pre-assembly state.

In some embodiments, as depicted in FIG. 10, the first seal ring 26 and the second seal ring 28 respectively have the butting sections 26a, 28a, at which the opposite end surfaces of the seal-ring strip processed in a ring shape are disposed facing each other via a gap. Further, when the first seal ring 26 and the second seal ring 28 are respectively mounted to the first seal groove 22A and the second seal groove 22B, the butting section 26a of the first seal ring 26 and the butting section 28a of the second seal ring 28 are disposed at an interval in the circumferential direction from each other.

According to this embodiment, the butting section 26a of the first seal ring 26 and the butting section 28a of the second seal ring 28 are disposed at an interval in the circumferential direction from each other, and thus it is possible to reduce leakage of a fluid leaking out through the butting section of one of the seal rings after the fluid leaks out through the butting section of the other one of the seal rings.

In some embodiments, as depicted in FIG. 10A, the butting section 26a of the first seal ring 26 and the butting section 28a of the second seal ring 28 are disposed at an interval of half a circumference in the circumferential direction from each other.

According to this embodiment, the butting section 26a of the first seal ring 26 and the butting section 28a of the second seal ring 28 are disposed at an interval of half a circumference in the circumferential direction from each other. Accordingly, it is possible to effectively reduce leakage of a fluid leaking out through the butting section of one of the seal rings after the fluid leaks out through the butting section of the other one of the seal rings.

In some embodiments, as depicted in FIG. 10A, the opening of the butting section 26a of the first seal ring 26 when the first seal ring 26 is mounted to the first seal groove 22A is greater than the opening of the butting section 28a of the second seal ring 28 when the second seal ring 28 is mounted to the second seal groove 22B.

Thus, according to the above embodiment, with the opening of the butting section 26a of the first seal ring 26 disposed on the side of the bearing 10A being larger than the opening of the butting section 28a of the second seal ring 28, it is possible to promote leakage of lubricant oil on the side of the bearing 10A through the butting section 26a of the first seal ring 26. Lubricant oil having leaked through the butting section 26a of the first seal ring 26 enters the clearance between the bearing-side wall surface 22Ba of the second seal groove 22B and the edge surface 28c of the second seal ring, and reduces friction between the bearing-side wall surface 22Ba of the second seal groove 22B and the edge surface 28c of the second seal ring 28. Accordingly, it is possible to reduce wear of the second seal ring 28 even further.

In some embodiments, as depicted in FIG. 10B, the first seal ring 26 includes the first-seal body portion 26A mounted to the first seal groove 22A, and a butting-closing portion 26C which protrudes toward the second seal ring 28 mounted to the second seal groove 22B and which is configured to fit into the butting section 28a of the second seal ring 28, in a state where the first seal ring 26 is mounted to the first seal groove 22A. In the depicted embodiment, the butting-closing portion 26C is formed at an interval of half a circumference from the butting section 26a in the circumferential direction.

According to this embodiment, the first seal ring 26 has the butting-closing portion 26C configured to fit into the butting section 28a of the second seal ring 28. With the butting-closing portion 26C fitted into the butting section 28a of the second seal ring 28, it is possible to close the butting section 28a of the second seal ring 28, and thereby it is possible to prevent lubricant oil having leaked through the butting section 26a of the first seal ring 26 from leaking out toward the turbine impeller 3 through the butting section 28a of the second seal ring 28.

Third Embodiment

Figure 11:
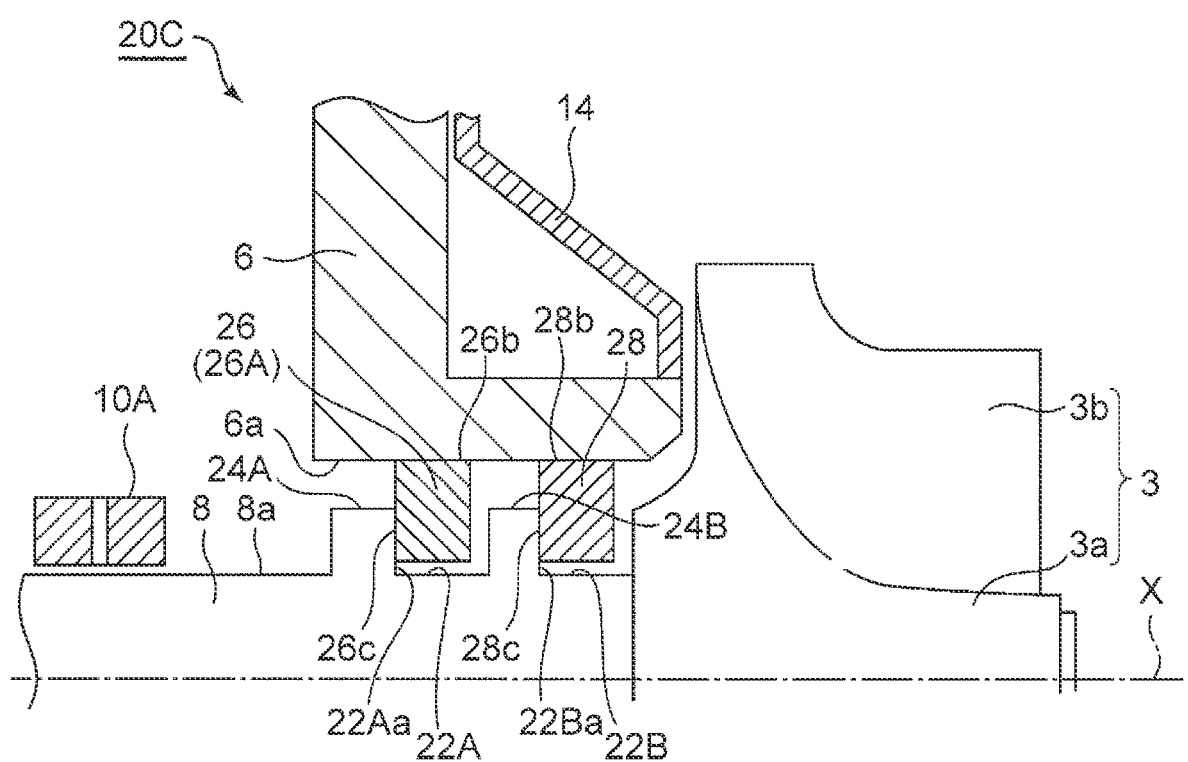
FIG. 11 is an enlarged view of section "a" in FIG. 1 and its peripheral structure, showing a cross-sectional view of a seal structure according to the third embodiment of the present invention.
Figure 12A:
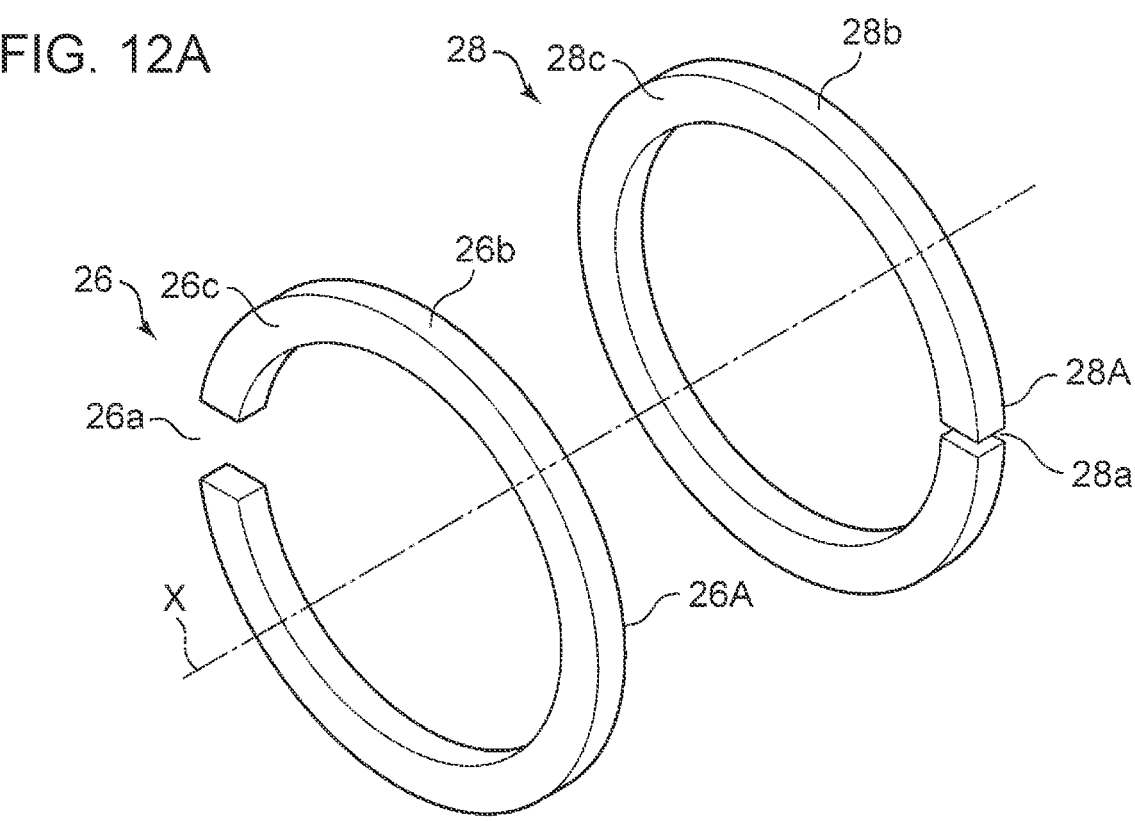
FIGS. 12A and 12B are exploded perspective views showing another first seal ring and second seal ring according to the third embodiment of the present invention in a pre-assembly state.
Figure 12B:
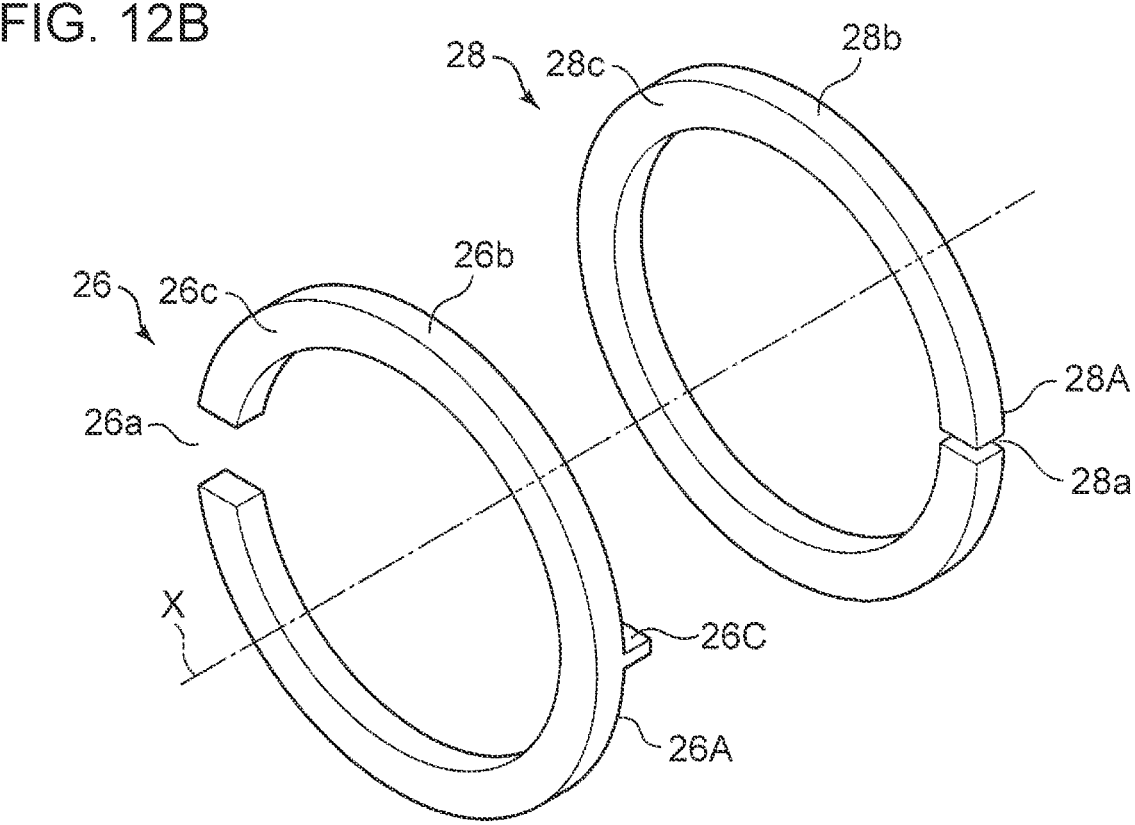

FIG. 11 is an enlarged view of section "a" in FIG. 1 and its peripheral structure, showing a cross-sectional view of a seal structure according to the third embodiment of the present invention. FIGS. 12A and 12B are exploded perspective views showing another first seal ring and second seal ring according to the third embodiment of the present invention in a pre-assembly state.

A seal structure 20C of the present embodiment has some features similar to those of the seal structure 20A of the first embodiment and the seal structure 20B of the second embodiment described above. Thus, the same components as those in the seal structure 20A of the first embodiment and the seal structure 20B of the second embodiment are associated with the same reference numerals and not described in detail.

The first seal ring 26 of the present embodiment is different from that in the first embodiment in that there is no first-seal protruding portion 26B formed. The first seal ring 26 of the present embodiment includes only the first-seal body portion 26A corresponding to the seal ring 26 of the above described first embodiment.

The inner peripheral surface 6a of the bearing housing 6 of the present embodiment is different from that in the second embodiment in that there is no housing-side stepped portion 6b formed. The inner peripheral surface 6a of the bearing housing 6 of the present embodiment has the same shape as the above described first embodiment.

Further, as depicted in FIG. 12A, the first seal ring 26 and the second seal ring 28 of the present embodiment respectively have the butting sections 26a, 28a, at which the opposite end surfaces of a seal-ring strip processed in a ring shape are disposed facing each other via a gap. Further, when the first seal ring 26 and the second seal ring 28 are respectively mounted to the first seal groove 22A and the second seal groove 22B, the butting section 26a of the first seal ring 26 and the butting section 28a of the second seal ring 28 are disposed at an interval in the circumferential direction from each other. Moreover, the opening of the butting section 26a of the first seal ring 26 when the first seal ring 26 is mounted to the first seal groove 22A is greater than the opening of the butting section 28a of the second seal ring 28 when the second seal ring 28 is mounted to the second seal groove 22B.

With the seal structure 20C of the present embodiment having the above configuration, the opening of the butting section 26a of the first seal ring 26 disposed on the side of the bearing 10A is larger than the opening of the butting section 28a of the second seal ring 28 disposed on the side of the turbine impeller 3. Thus, it is possible to promote leakage of lubricant oil of the side of the bearing 10A through the butting section 26a of the first seal ring 26.

Lubricant oil having leaked through the butting section 26a of the first seal ring 26 enters the clearance between the bearing-side wall surface 22Ba of the second seal groove 22B and the edge surface 28c of the second seal ring 28, and reduces friction between the bearing-side wall surface 22Ba of the second seal groove 22B and the edge surface 28c of the second seal ring 28. Accordingly, it is possible to suppress wear of the second seal ring 28 caused by high-pressure gas from the turbine impeller 3 pressing the second seal ring 28 against the bearing-side wall surface 22Ba of the second seal groove 22B.

Further, the butting section 26a of the first seal ring 26 and the butting section 28a of the second seal ring 28 are disposed at an interval in the circumferential direction, and thereby it is possible to reduce leakage of a fluid through the butting section of one of the seal rings after the fluid leaks out through the butting section of the other one of the seal rings. In particular, it is possible to suppress leakage of lubricant oil having leaked through the butting section 26a of the first seal ring 26 toward the impeller through the butting section 28a of the second seal ring 28.

In some embodiments, as depicted in FIG. 12A, the butting section 26a of the first seal ring 26 and the butting section 28a of the second seal ring 28 are disposed at an interval of half a circumference in the circumferential direction from each other.

According to this embodiment, the butting section 26a of the first seal ring 26 and the butting section 28a of the second seal ring 28 are disposed at an interval of half a circumference in the circumferential direction from each other. Accordingly, it is possible to effectively reduce leakage of a fluid through the butting section of one of the seal rings after the fluid leaks out through the butting section of the other one of the seal rings. In particular, it is possible to effectively suppress leakage of lubricant oil having leaked through the butting section 26a of the first seal ring 26 toward the turbine impeller 3 through the butting section 28a of the second seal ring 28.

In some embodiments, as depicted in FIG. 12B, the first seal ring 26 includes, in a state where the first seal ring 26 is mounted to the first seal groove 22A, the first-seal body portion 26A mounted to the first seal groove 22A, and a butting-closing portion 26C which protrudes toward the second seal ring 28 mounted to the second seal groove 22B and which is configured to fit into the butting section 28a of the second seal ring 28.

According to this embodiment, the first seal ring 26 has the butting-closing portion 26C configured to fit into the butting section 28a of the second seal ring 28. With the butting-closing portion 26C fitted into the butting section 28a of the second seal ring 28, it is possible to close the butting section 28a of the second seal ring 28, and thereby it is possible to prevent lubricant oil having leaked through the butting section 26a of the first seal ring 26 from leaking out toward the turbine impeller 3 through the butting section 28a of the second seal ring 28.

The embodiments of the present invention have been described above. However, the present invention is not limited thereto. For instance, various modifications may be applied as long as they do not depart from the object of the present invention.

For instance, in the above embodiments, the seal structures 20A, 20B, 20C are disposed between the bearing 10A and the turbine impeller 3. However, a seal structure of the present invention is not limited thereto, and may be disposed between the bearing 10B and the compressor impeller 5.

Further, for instance, in the above embodiments, the turbocharger 1 is described as an example of a supercharger of the present invention. However, a supercharger of the present invention is not limited thereto, and may be an electric compressor with a rotary shaft rotated by a motor, an electric assist turbo with a rotary shaft rotated by both a motor and a turbine impeller, a mechanical supercharger with a rotary shaft rotated by a mechanical force, or the like.

INDUSTRIAL APPLICABILITY

A seal structure according to at least one embodiment of the present invention can be suitably used as a seal structure used in a supercharger such as a turbocharger, an electric compressor, an electric assist turbo, and a mechanical supercharger.

DESCRIPTION OF REFERENCE NUMERAL

1 Turbocharger
2 Turbine housing
3 Turbine impeller
3a Turbine hub
3b Turbine blade
4 Compressor housing
5 Compressor impeller
5a Compressor hub
5b Compressor blade
6 Bearing housing
6a Inner peripheral surface
6a1 Stepped surface
6b Housing-side stepped portion
8 Rotary shaft
8a Outer peripheral surface
10A Bearing
10B Bearing (thrust bearing)
11 Exhaust-gas outlet
12 Lubricant-oil channel
13 Turbine scroll passage
14 Back plate
15 Intake inlet
16 Nut
17 Compressor scroll passage
20A, 20B, 20C Seal structure
22A First seal groove
22Aa Bearing-side wall surface
22B Second seal groove
22Ba Bearing-side wall surface
23A First recess portion
23B Second recess portion
24A First projecting portion
24B Second projecting portion
26 First seal ring
26a Butting section
26b Outer peripheral surface
26c Edge surface
26A First-seal body portion
26B First-seal protruding portion
26Bd Circumference-end surface
26C Butting-closing portion
28 Second seal ring
28a Butting section
28b Outer peripheral surface
28c Edge surface
28A Second-seal body portion
28B Second-seal protruding portion
28Bd Circumference-end surface

The invention claimed is:

1. A seal structure for a supercharger including a rotary shaft, an impeller disposed on an end portion of the rotary shaft, and a bearing housing which accommodates a bearing for rotatably supporting the rotary shaft, the seal structure being provided to seal clearance between an outer peripheral surface of the rotary shaft and an inner peripheral surface of the bearing housing, and comprising:
  a first seal groove of an annular shape, formed on the outer peripheral surface of the rotary shaft and between the impeller and the bearing with respect to an axial direction of the rotary shaft;
  a second seal groove of an annular shape, formed on the outer peripheral surface of the rotary shaft and between the impeller and the bearing with respect to the axial direction of the rotary shaft, and disposed between the first seal groove and the impeller;
  a first seal ring to be mounted to the first seal groove; and
  a second seal ring to be mounted to the second seal groove,
  wherein the first seal ring includes, in a state in which the first seal ring is mounted to the first seal groove,
    a first-seal body portion mounted to the first seal groove, and
    a first-seal protruding portion protruding from the first-seal body portion toward the second seal ring mounted to the second seal groove, and being configured to be in contact with the second seal ring contacting a bearing-side wall surface of the second seal groove, in a state in which the first-seal body portion is in contact with a bearing-side wall surface of the first seal groove.

2. The seal structure according to claim 1, wherein the second seal ring includes, in a state in which the second seal ring is mounted to the second seal groove,
  a second-seal body portion mounted to the second seal groove, and
  a second-seal protruding portion protruding from the second-seal body portion toward the first seal ring mounted to the first seal groove, and being configured to be in contact with the first seal ring contacting the bearing-side wall surface of the first seal groove, in a state in which the second-seal body portion is in contact with the bearing-side wall surface of the second seal groove, wherein the first-seal protruding portion of the first seal ring is formed continuously over half a circumference of the first seal ring in a circumferential direction, wherein the second-seal protruding portion of the second seal ring is formed continuously over half a circumference of the second seal ring in the circumferential direction, and wherein the first-seal protruding portion of the first seal ring is configured to be in contact with the second-seal body portion of the second seal ring, and the second-seal protruding portion of the second seal ring is configured to be in contact with the first-seal body portion of the first seal ring, in a state in which the first seal ring and the second seal ring are respectively mounted to the first seal groove and the second seal groove.

3. The seal structure according to claim 2, wherein the first seal ring and the second seal ring are formed to have the same shape.

4. The seal structure according to claim 2,
wherein each of the first seal ring and the second seal ring comprises a seal-ring strip processed into a ring shape, and a butting section at which opposite end surfaces of the seal-ring strip face each other via a gap, and wherein the butting section of the first seal ring and the butting section of the second seal ring are disposed at an interval of half a circumference in the circumferential direction, in a state in which the first seal ring and the second seal ring are respectively mounted to the first seal groove and the second seal groove.

5. The seal structure according to claim 4,
wherein the gap of the butting section of the first seal ring in a state where the first seal ring is mounted to the first seal groove is greater than the gap of the butting section of the second seal ring in a state where the second seal ring is mounted to the second seal groove.

6. The seal structure according to claim 5,
wherein the first seal ring further includes a butting closing portion which is protruding toward the second seal ring mounted to the second seal groove and which is configured to fit into the butting section of the second seal ring, in a state where the first seal ring is mounted to the first seal groove.

7. A supercharger comprising the seal structure according to claim 1.

8. A seal structure for a supercharger including a rotary shaft, an impeller disposed on an end portion of the rotary shaft, and a bearing housing which accommodates a bearing for rotatably supporting the rotary shaft, the seal structure being provided to seal clearance between an outer peripheral surface of the rotary shaft and an inner peripheral surface of the bearing housing, and comprising:

a first seal groove of an annular shape, formed on the outer peripheral surface of the rotary shaft and between the impeller and the bearing with respect to an axial direction of the rotary shaft;

a second seal groove of an annular shape, formed on the outer peripheral surface of the rotary shaft and between the impeller and the bearing with respect to the axial direction of the rotary shaft, and disposed between the first seal groove and the impeller;

a first seal ring to be mounted to the first seal groove;

a second seal ring to be mounted to the second seal groove; and a housing-side stepped portion formed on the inner peripheral surface of the bearing housing, the housing-side stepped portion extending in a direction intersecting the rotary shaft, wherein the second seal ring comprises an edge surface extending in a direction intersecting the rotary shaft, the edge surface of the second seal ring orienting to the first seal ring, and wherein the housing-side stepped portion is configured to contact the edge surface of the second seal ring, in a state where the edge surface of the second seal ring is in contact with a bearing-side wall surface of the second seal groove.

9. The seal structure according to claim 8,
wherein each of the first seal ring and the second seal ring comprises a seal-ring strip processed into a ring shape and a butting section at which opposite end surfaces of the seal-ring strip face each other via a gap, and wherein the butting section of the first seal ring and the butting section of the second seal ring are disposed at an interval in the circumferential direction, in a state in which the first seal ring and the second seal ring are respectively mounted to the first seal groove and the second seal groove.

10. The seal structure according to claim 9,
wherein the butting section of the first seal ring and the butting section of the second seal ring are disposed at an interval of half a circumference in the circumferential direction from each other.

11. The seal structure according to claim 9,
wherein the gap of the butting section of the first seal ring in a state where the first seal ring is mounted to the first seal groove is greater than the gap of the butting section of the second seal ring in a state where the second seal ring is mounted to the second seal groove.

12. The seal structure according to claim 11,
wherein the first seal ring includes, in a state in which the first seal ring is mounted to the first seal groove,
a first-seal body portion mounted to the first seal groove, and
a butting closing portion which is protruding toward the second seal ring mounted to the second seal groove and which is configured to fit into the butting section of the second seal ring.

13. A supercharger comprising the seal structure according to claim 8.

14. A seal structure for a supercharger including a rotary shaft, an impeller disposed on an end portion of the rotary shaft, and a bearing housing which accommodates a bearing for rotatably supporting the rotary shaft, the seal structure being provided to seal clearance between an outer peripheral surface of the rotary shaft and an inner peripheral surface of the bearing housing, and comprising:

a first seal groove of an annular shape, formed on the outer peripheral surface of the rotary shaft and between the impeller and the bearing with respect to an axial direction of the rotary shaft;

a second seal groove of an annular shape, formed on the outer peripheral surface of the rotary shaft and between the impeller and the bearing with respect to the axial direction of the rotary shaft, and disposed between the first seal groove and the impeller;

a first seal ring to be mounted to the first seal groove; and a second seal ring to be mounted to the second seal groove, wherein each of the first seal ring and the second seal ring comprises a seal-ring strip processed into a ring shape, and a butting section at which opposite end surfaces of the seal-ring strip face each other via a gap, wherein the butting section of the first seal ring and the butting section of the second seal ring are disposed at an interval in the circumferential direction from each other, in a state in which the first seal ring and the second seal ring are respectively mounted to the first seal groove and the second seal groove, and wherein the gap of the butting section of the first seal ring in a state where the first seal ring is mounted to the first seal groove is greater than the gap of the butting section of the second seal ring in a state where the second seal ring is mounted to the second seal groove.

15. The seal structure according to claim 14, wherein the butting section of the first seal ring and the butting section of the second seal ring are disposed at an interval of half a circumference in the circumferential direction from each other.

16. The seal structure according to claim 14, wherein the first seal ring includes, in a state in which the first seal ring is mounted to the first seal groove,
   a first-seal body portion mounted to the first seal groove, and
   a butting closing portion which is protruding toward the second seal ring mounted to the second seal groove and which is configured to fit into the butting section of the second seal ring.

17. A supercharger comprising the seal structure according to claim 14.

* * * * *